(12) United States Patent
Takagi

(10) Patent No.: US 12,318,928 B2
(45) Date of Patent: Jun. 3, 2025

(54) CONTINUUM ROBOT CONTROL SYSTEM AND CONTROL METHOD, AND PROGRAM

(71) Applicant: CANON KABUSHIKI KAISHA, Tokyo (JP)

(72) Inventor: Kiyoshi Takagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 222 days.

(21) Appl. No.: 18/069,127

(22) Filed: Dec. 20, 2022

(65) Prior Publication Data

US 2023/0131269 A1    Apr. 27, 2023

Related U.S. Application Data

(63) Continuation of application No. PCT/JP2021/023884, filed on Jun. 24, 2021.

(30) Foreign Application Priority Data

Jun. 25, 2020 (JP) ................................. 2020-109850
Jun. 16, 2021 (JP) ................................. 2021-100189

(51) Int. Cl.
  *B25J 9/06* (2006.01)
  *B25J 9/10* (2006.01)
  (Continued)

(52) U.S. Cl.
  CPC ............. *B25J 9/104* (2013.01); *B25J 13/088* (2013.01); *B25J 18/06* (2013.01)

(58) Field of Classification Search
  CPC . B25J 9/104; B25J 13/088; B25J 18/06; B25J 9/1625; B25J 9/06; G05B 2219/40234
  See application file for complete search history.

(56) References Cited

U.S. PATENT DOCUMENTS

| 9,901,410 B2 * | 2/2018 | Oyola ................... A61B 90/50 |
| 11,331,797 B2 * | 5/2022 | Takagi .................. A61B 34/71 |

(Continued)

FOREIGN PATENT DOCUMENTS

| JP | 2018-523508 A | 8/2018 |
| JP | 2018-175602 A | 11/2018 |

(Continued)

OTHER PUBLICATIONS

International Search Report and Written Opinion for PCT/JP2021/023884, including Form PCT/ISA/210 in English and Including Machine Translation for Written Opinion obtained from PatentScope via WIPO IP Portal on Dec. 9, 2022.

*Primary Examiner* — Masud Ahmed
(74) *Attorney, Agent, or Firm* — CANON U.S.A., INC. IP DIVISION

(57) ABSTRACT

An object is to provide a mechanism that can ensure safe operation of a continuum robot. A block FTL calculates a target bending angle $\theta_{fFTL}$ and a target rotational angle $\zeta_{fFTL}$ of a following bending section on the basis of a target bending angle $\theta_{lt}$ and a target rotational angle $\zeta_{lt}$ of a distal-most bending section and a displacement of a base. A switch unit 330 selects the target bending angle $\theta_{fFTL}$ and the target rotational angle $\theta_{fFTL}$ of the following bending section obtained from the block FTL or a target bending angle $\theta_{lf}$ and a target rotational angle $\zeta_{lf}$ of the following bending section obtained from a block $P_l$ corresponding to following operating means. A kinematic computing unit 340 computes, on the basis of the target bending angle and the target rotational angle, a drive displacement by which a driving unit drives a wire in the following bending section.

6 Claims, 30 Drawing Sheets

(51) Int. Cl.
*B25J 13/08* (2006.01)
*B25J 18/06* (2006.01)

(56) References Cited

U.S. PATENT DOCUMENTS

| | | | |
|---|---|---|---|
| 2006/0178562 A1* | 8/2006 | Saadat | A61B 1/0055 600/142 |
| 2014/0330432 A1* | 11/2014 | Simaan | B25J 9/1625 700/250 |
| 2017/0049298 A1* | 2/2017 | Hunter | A61B 5/067 |
| 2018/0243900 A1* | 8/2018 | Tanaka | B25J 9/065 |
| 2019/0015978 A1* | 1/2019 | Takagi | B25J 9/065 |
| 2020/0179652 A1* | 6/2020 | Williams | A61M 25/0155 |
| 2020/0230808 A1* | 7/2020 | Simaan | B25J 18/06 |
| 2021/0369081 A1* | 12/2021 | Kose | A61B 34/30 |
| 2022/0040854 A1* | 2/2022 | Peng | B25J 9/06 |

FOREIGN PATENT DOCUMENTS

| | | |
|---|---|---|
| JP | 2018-176406 A | 11/2018 |
| JP | 2019-058648 A | 4/2019 |
| JP | 2019-166307 A | 10/2019 |
| WO | 2017/003468 A1 | 1/2017 |
| WO | 2017/033356 A1 | 2/2017 |

* cited by examiner

CONTINUUM ROBOT CONTROL SYSTEM AND CONTROL METHOD, AND PROGRAM

CROSS-REFERENCE TO RELATED APPLICATIONS

This application is a Continuation of International Patent Application No. PCT/JP2021/023884, filed Jun. 24, 2021, which is incorporated by reference herein in its entirety and which claims the benefit of Japanese Patent Application No. 2020-109850, filed Jun. 25, 2020 and Japanese Patent Application No. 2021-100189, filed Jun. 16, 2021, both of which are hereby incorporated by reference herein in their entireties.

TECHNICAL FIELD

The present disclosure relates to a control system and method for controlling a continuum robot that includes a bendable portion having a plurality of bending sections bent by being driven by a wire, and also relates to a program that causes a computer to function as the control system.

BACKGROUND ART

A continuum robot includes a bendable portion having a plurality of bending sections with a flexible structure. The shape of the continuum robot is controlled by deforming the bending sections. Such continuum robots have mainly two advantages over rigid-link robots composed of rigid links. One advantage is that continuum robots can move along curves in confined spaces where rigid-link robots may get stuck, and in environments where objects are scattered. The other advantage is that intrinsic softness of the continuum robots allows operation without damaging fragile objects. The operation does not necessarily require detection of external force that rigid-link robots require. With this feature, the continuum robots are expected to be applied in the field of medical instruments, such as endoscope sheaths and catheters, and in the field of robots for hazardous environments, such as rescue robots.

Patent Literature 1 describes a control method that enables characteristic motions of a continuum robot having a camera at the distal end of a bendable portion thereof (hereinafter referred to as "observation motion control") with a simple operation by the operator. Examples of the observation motion control include moving the position of the distal end while keeping constant the direction of the line of sight of the camera, and changing the position and angle of the distal end in such a way that the line of sight of the camera always passes through a single distant point.

CITATION LIST

Patent Literature

PTL 1 International Publication No. 2017/003468

Specifically, for transition to the observation motion control from an initial bending attitude of the bendable portion, the method described in Patent Literature 1 algebraically determines the amount of additional bending of all bending sections of the bendable portion from the amount of operation of an operating unit by the operator. In the control described in Patent Literature 1, therefore, even when the amount of operation of the operating unit by the operator is small, the amount of additional bending of each bending section may be controlled significantly, depending on the initial bending attitude of the bendable portion. Generally, the continuum robot can be moved along a narrow path in an object in a confined space by control (hereinafter referred to as "follow-the-leader control") that continuously transmits the bending attitude of the leading distal-most bending section to the following bending section along the length of each bending section. If the control described in Patent Literature 1 is performed in such a confined space, the continuum robot may accidentally come into contact with the object. This may damage the object or the continuum robot and it will be difficult to ensure safe operation of the continuum robot.

SUMMARY OF INVENTION

One or more features of the present disclosure have been made in view of the issues described above. At least one object of the present disclosure is to provide at least one mechanism that may ensure safe operation of a continuum robot.

A continuum robot control system according to an aspect of the present disclosure is a system for controlling a continuum robot that includes a bendable portion having a plurality of bending sections bent by being driven by a wire, a base configured to support the bendable portion, and a driving unit configured to drive the wire. The continuum robot control system includes following calculating means, following operating means, following switching means, and computing means. The following calculating means calculates a target bending angle and a target rotational angle of a following bending section of the plurality of bending sections on the basis of a target bending angle and a target rotational angle of a distal-most bending section of the plurality of bending sections and a displacement of the base in a direction of movement of the continuum robot. The distal-most bending section is located farthest from the base, and the following bending section is located between the distal-most bending section and the base. The following operating means receives a target bending angle and a target rotational angle of the following bending section by being operated. The following switching means performs a switching operation for selecting the target bending angle and the target rotational angle of the following bending section obtained from the following calculating means or the target bending angle and the target rotational angle of the following bending section obtained from the following operating means. The computing means computes, on the basis of the target bending angle and the target rotational angle of the following bending section selected by the following switching means, a drive displacement by which the driving unit drives the wire in the following bending section.

Other aspects of the present disclosure include a continuum robot control method for the continuum robot control system, and a program that causes a computer to function as the continuum robot control system.

Further features of the present disclosure will become apparent from the following description of exemplary embodiments with reference to the attached drawings.

DESCRIPTION OF EMBODIMENTS

Hereinafter, embodiments of the present disclosure will be described with reference to the drawings.

First Embodiment

A first embodiment of the present disclosure will now be described.

Figure 1:
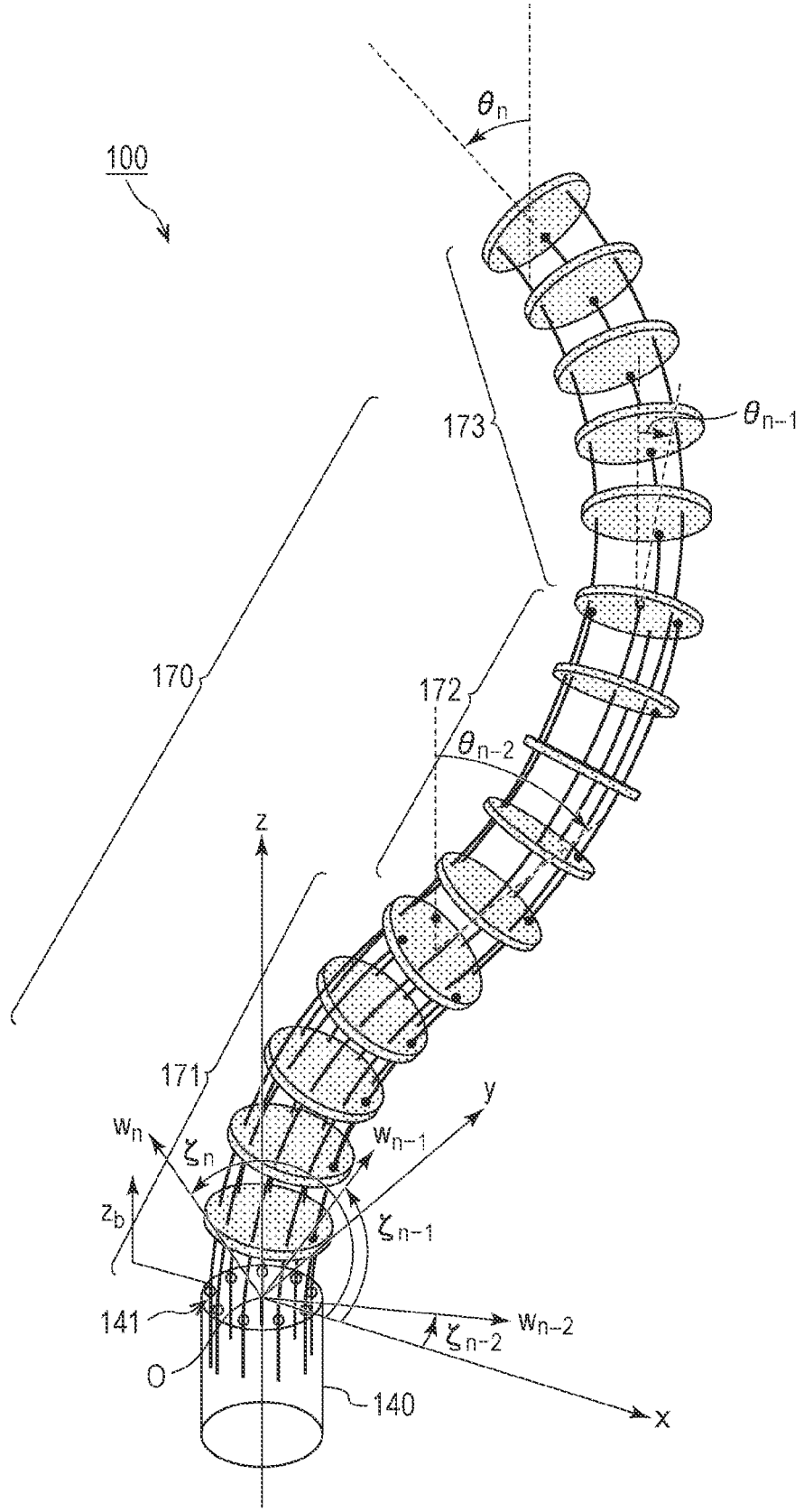
FIG. 1 is a diagram illustrating an example of a general configuration of a continuum robot according to a first embodiment of the present disclosure.

FIG. 1 is a diagram illustrating an example of a general configuration of a continuum robot 100 according to the first embodiment of the present disclosure. FIG. 1 illustrates a base 140 and a bendable portion 170 as components of the continuum robot 100.

The bendable portion 170 is a component including a plurality of bending sections 171 to 173 bent by being driven by wires. Specifically, FIG. 1 illustrates n (three) bending sections: the bending section 171 corresponding to (n−2), the bending section 172 corresponding to (n−1), and the bending section 173 corresponding to n. FIG. 1 also illustrates a bending angle $\theta_n$ and a rotational angle $\zeta_n$ of the bending section 173, a bending angle $\theta_{n-1}$ and a rotational angle $\zeta_{n-1}$ of the bending section 172, and a bending angle $\theta_{n-2}$ and a rotational angle $\zeta_{n-2}$ of the bending section 171. The base 140 is a component that supports the bendable portion 170. The base 140 includes internal actuators (not shown in FIG. 1) serving as driving units that drive the respective wires for the bending sections 171 to 173. FIG. 1 also illustrates an xyz coordinate system that has an origin O at a predetermined position (e.g., center position) of an upper surface 141 of the base 140, with a z direction being the direction of movement of the continuum robot 100 (e.g., direction of forward movement) and x and y directions being orthogonal to the z direction and orthogonal to each other. The continuum robot 100 is thus capable of moving in the z direction as well as allowing a bending motion of the plurality of bending sections 171 to 173 of the bendable portion 170. In FIG. 1, a displacement $z_b$ of the base 140 is illustrated as an index that represents the amount of movement (amount of forward movement) of the continuum robot 100 in the z direction.

Of the plurality of bending sections 171 to 173 constituting the bendable portion 170, the bending section 173 is the distal-most bending section farthest from the base 140 in FIG. 1. The bending section 172 (and the bending section 171 as well) is a following bending section disposed between the bending section 173 (distal-most bending section) and the base 140 and configured to follow the bending section 173 (distal-most bending section) as the continuum robot 100 moves forward. During forward movement of the continuum robot 100, the bending section 173 (distal-most bending section) is a leading bending section.

Figure 2:
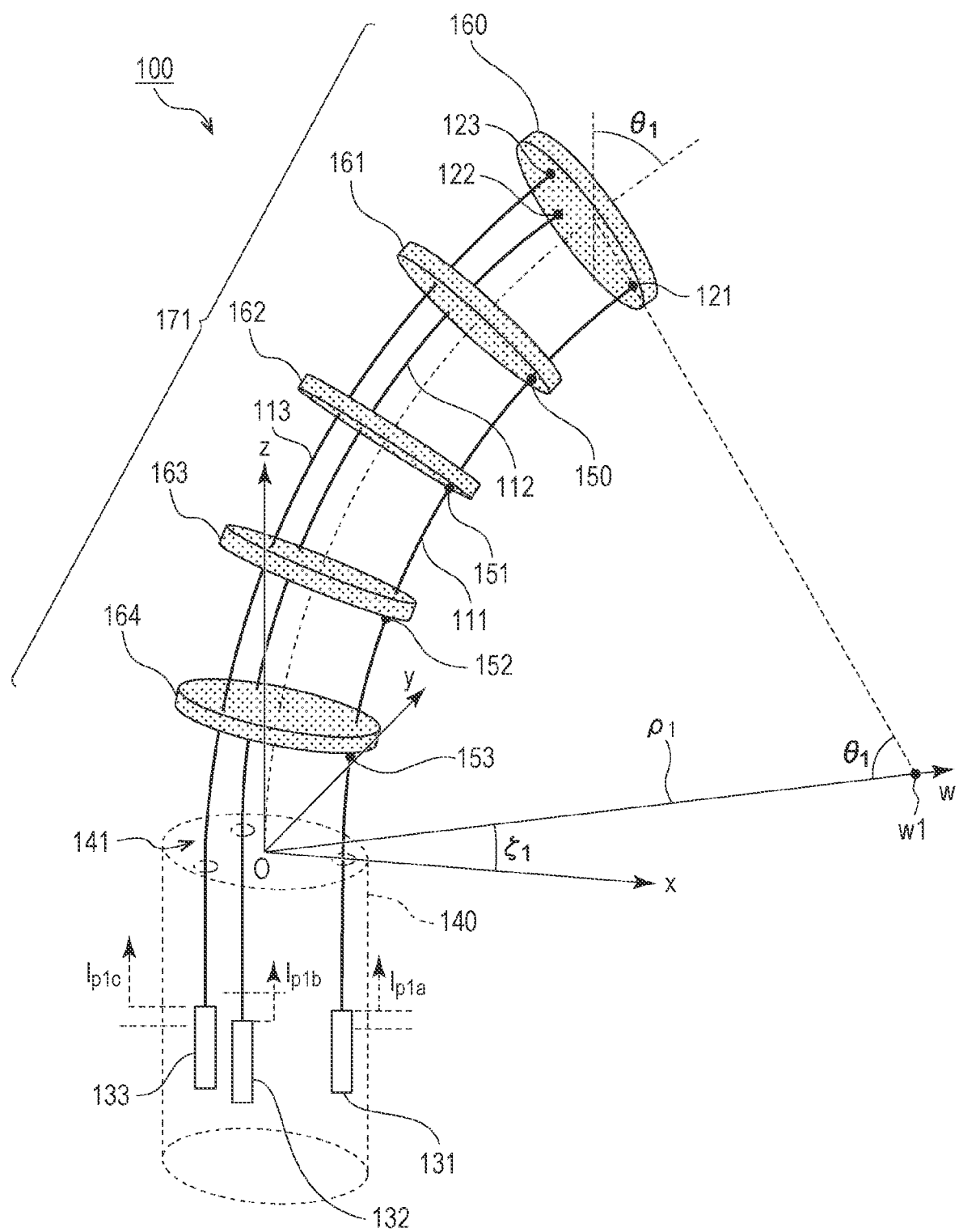
FIG. 2 is a diagram illustrating details of one bending section of the continuum robot illustrated in FIG. 1.

FIG. 2 is a diagram illustrating details of the bending section 171 of the continuum robot 100 illustrated in FIG. 1. That is, FIG. 2 illustrates in detail the configuration of the bending section 171 at a proximal end closest to the base 140. In FIG. 2, the same elements as those in FIG. 1 are denoted by the same reference numerals and their detailed description will be omitted. In FIG. 2, the bending angle of the bending section 171 is denoted by $\theta_1$, the rotational angle of the bending section 171 is denoted by $\zeta_1$, and the radius of curvature of the bending section 171 (corresponding to a line segment connecting points O and w1 in FIG. 2) is denoted by pi.

The continuum robot 100 includes wires 111, 112, and 113 connected to connection points 121, 122, and 123, respectively, in a distal end 160 of the bending section 171. The wires 111, 112, and 113 are pushed and pulled by actuators 131, 132, and 133, respectively, inside the base 140, so that the attitude (bending shape) of the continuum robot 100 is controlled. The actuator 131 is a driving unit for driving the wire 111, the actuator 132 is a driving unit for driving the wire 112, and the actuator 133 is a driving unit for driving the wire 113.

The continuum robot 100 includes wire guides 161 to 164 for guiding the wires 111 to 113 in the bending section 171. The wire guides 161 to 164 may be a plurality of members discretely arranged, or may be constituted by a continuum member, such as a bellows or mesh member. The wire guides 161 to 164 are secured to the wire 111 at fixed points 150 to 153. In FIG. 2, the central axis of the continuum robot 100 is indicated by a broken line.

In the present embodiment, the wires 111, 112, and 113 are referred to as Wire a, Wire b, and Wire c, respectively, counterclockwise in the xy plane.

Specifically, in the example illustrated in FIG. 2, the wire 111 corresponds to Wire a, and the drive displacement of the wire 111 pushed and pulled by the actuator 131 in the bending section 171 is denoted by $l_{p1a}$. Also, in the example illustrated in FIG. 2, the wire 112 corresponds to Wire b, and the drive displacement of the wire 112 pushed and pulled by the actuator 132 in the bending section 171 is denoted by $l_{p1b}$. Also, in the example illustrated in FIG. 2, the wire 113 corresponds to Wire c, and the drive displacement of the wire 113 pushed and pulled by the actuator 133 in the bending section 171 is denoted by $l_{p1c}$.

FIG. 2 illustrates in detail the configuration of the bending section 171 alone. The bending section 172 and the bending section 173 illustrated in FIG. 1 are configured similarly to the bending section 171 illustrated in FIG. 2. That is, the bending section 172 and the bending section 173 each include wires corresponding to the wires 111 to 113, actuators corresponding to the actuators 131 to 133, a distal end corresponding to the distal end 160, and wire guides corresponding to the wire guides 161 to 164. The drive displacements of Wires a to c that drive the n-th bending section are denoted in a generalized way by $l_{pna}$, $l_{pnb}$, and $l_{pnc}$.

Figure 3:
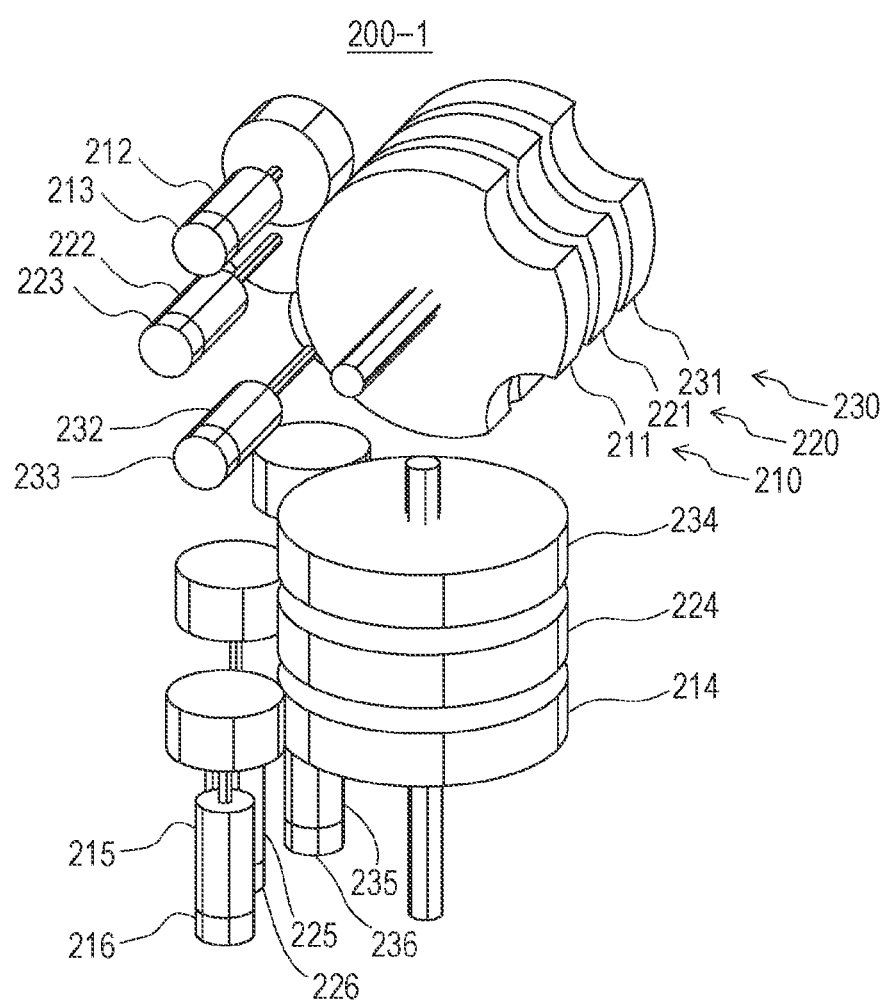
FIG. 3 is a diagram illustrating an example of a general configuration of an operating device for operating three bending sections of the continuum robot illustrated in FIG. 1, according to the first embodiment of the present disclosure.

FIG. 3 is a diagram illustrating an example of a general configuration of an operating device 200 for operating the three bending sections 171 to 173 of the continuum robot 100 illustrated in FIG. 1, according to the first embodiment of the present disclosure. In the following description, the operating device 200 according to the first embodiment illustrated in FIG. 3 is referred to as an "operating device 200-1".

As illustrated in FIG. 3, the operating device 200-1 includes a first operating unit 210 for operating the first bending section 171, a second operating unit 220 for operating the second bending section 172, and a third operating unit 230 for operating the third bending section 173.

Components 231 to 233 of the third operating unit 230 are components related to the bending angle $\theta_n$ of the third bending section 173 (distal-most bending section). Specifically, the operating lever 231 is an operating lever for the bending angle $\theta_n$ of the third bending section 173 and is driven by the motor 232. The angle of rotation of the operating lever 231 is detected by the angular sensor 233. The motor 232 and the angular sensor 233 are secured to a housing (not shown) of the operating lever 231. Also, components 234 to 236 of the third operating unit 230 are components related to the rotational angle $\zeta_n$ of the third bending section 173 (distal-most bending section). Specifically, the operating lever 234 is an operating lever for the rotational angle $\zeta_n$ of the third bending section 173 and is driven by the motor 235. The angle of rotation of the operating lever 234 is detected by the angular sensor 236. The motor 235 and the angular sensor 236 are secured to a housing (not shown) of the operating lever 234. The third operating unit 230 thus corresponds to distal-most operating means that is operated, for example, by the operator and receives the target bending angle $\theta_n$ and the target rotational angle $\zeta_n$ of the third bending section 173 (distal-most bending section).

Components 221 to 223 of the second operating unit 220 are components related to the bending angle $\theta_{n-1}$ of the second bending section 172 (following bending section). Specifically, the operating lever 221 is an operating lever for the bending angle $\theta_{n-1}$ of the second bending section 172 and is driven by the motor 222. The angle of rotation of the operating lever 221 is detected by the angular sensor 223. The motor 222 and the angular sensor 223 are secured to a housing (not shown) of the operating lever 221. Also, components 224 to 226 of the second operating unit 220 are components related to the rotational angle $\zeta_{n-1}$ of the second bending section 172 (following bending section). Specifically, the operating lever 224 is an operating lever for the rotational angle $\zeta_{n-1}$ of the second bending section 172 and is driven by the motor 225. The angle of rotation of the operating lever 224 is detected by the angular sensor 226. The motor 225 and the angular sensor 226 are secured to a housing (not shown) of the operating lever 224. The second operating unit 220 thus corresponds to second following operating means that is operated, for example, by the operator and receives the target bending angle $\theta_{n-1}$ and the target rotational angle $\zeta_{n-1}$ of the second bending section 172 (second following bending section).

Components 211 to 213 of the first operating unit 210 are components related to the bending angle $\theta_{n-2}$ of the first bending section 171 (following bending section). Specifically, the operating lever 211 is an operating lever for the bending angle $\theta_{n-2}$ of the first bending section 171 and is driven by the motor 212. The angle of rotation of the operating lever 211 is detected by the angular sensor 213. The motor 212 and the angular sensor 213 are secured to a housing (not shown) of the operating lever 211. Also, components 214 to 216 of the first operating unit 210 are components related to the rotational angle $\zeta_{n-2}$ of the first bending section 171 (following bending section).

Specifically, the operating lever 214 is an operating lever for the rotational angle $\zeta_{n-2}$ of the first bending section 171 and is driven by the motor 215. The angle of rotation of the operating lever 214 is detected by the angular sensor 216. The motor 215 and the angular sensor 216 are secured to a housing (not shown) of the operating lever 214. The first operating unit 210 thus corresponds to first following operating means that is operated, for example, by the operator and receives the target bending angle $\theta_{n-2}$ and the target rotational angle $\zeta_{n-2}$ of the first bending section 171 (first following bending section).

As described above, for the bending sections 171 to 173, the operating device 200-1 includes the operating levers 211, 221, and 231 for the respective bending angles $\theta$ and the operating levers 214, 224, and 234 for the respective rotational angles $\zeta$. In the present embodiment, when a continuum robot control system 300 (to be described with reference to FIG. 4) controls the bending angle $\theta$ or the rotational angle $\zeta$ of the continuum robot 100 to any target angle, the operating levers 211, 221, and 231 or the operating levers 214, 224, and 234 are controlled to provide the same angle as the target angle.

The operating levers 211, 221, and 231 and the operating levers 214, 224, and 234 each include a sensor (not shown) that detects contact by the operator. The sensor for each of the operating levers 211, 221, and 231 and the operating levers 214, 224, and 234 may be a push-button switch, or may be a sensor that detects capacitance. There may be an operation button (not shown) for controlling the displacement $z_b$ of the base 140, or may be a plurality of switches (not shown) for changing the motion mode.

Figure 4:
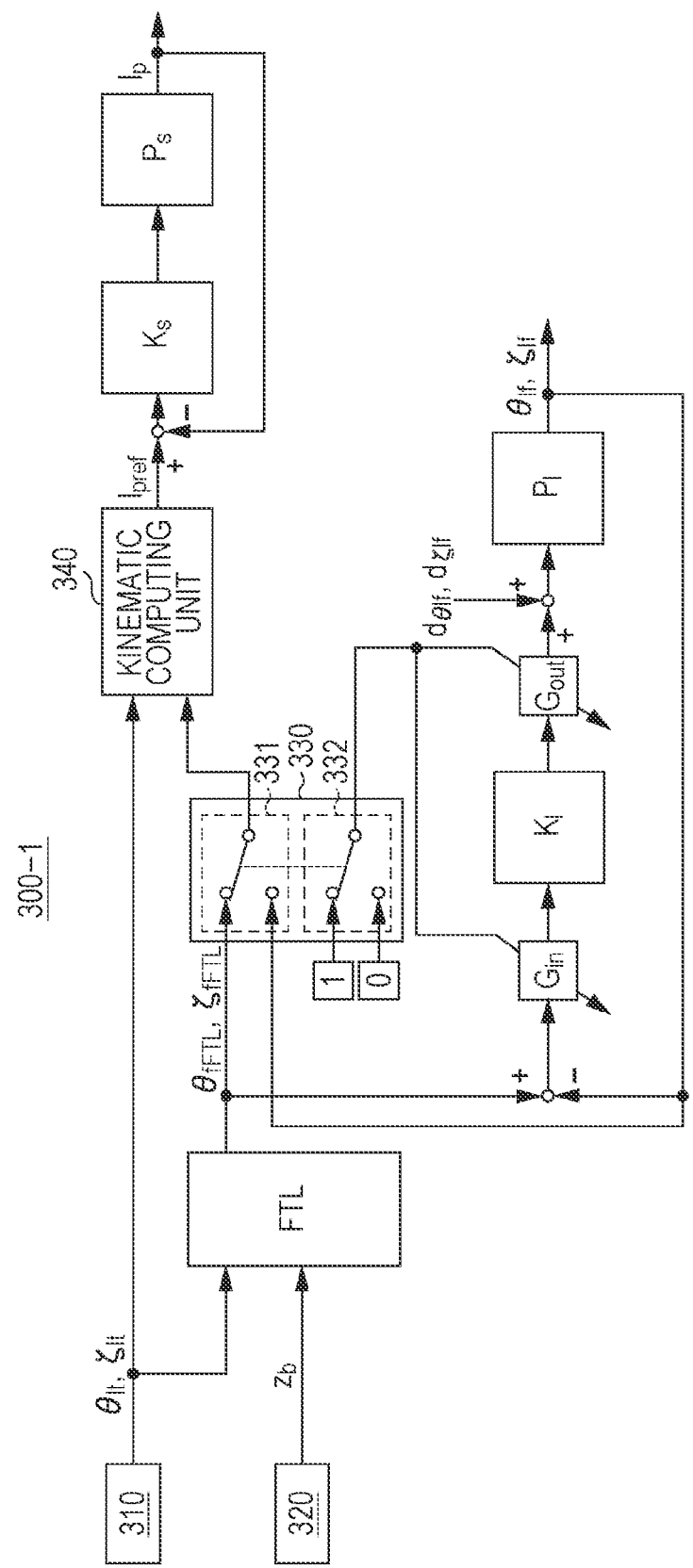
FIG. 4 is a diagram illustrating an example of a general configuration of a continuum robot control system according to the first embodiment of the present disclosure.

FIG. 4 is a diagram illustrating an example of a general configuration of the continuum robot control system 300 according to the first embodiment of the present disclosure.

In the following description, the continuum robot control system 300 according to the first embodiment illustrated in FIG. 4 is referred to as a "continuum robot control system 300-1". Specifically, FIG. 4 is a block diagram illustrating a control system for switching between follow-the-leader control and observation motion control.

In the continuum robot control system 300-1 illustrated in FIG. 4, a block $P_s$ represents the continuum robot 100 to be controlled (or more specifically, an actuator serving as a driving unit, corresponding to the actuators 131 to 133 illustrated in FIG. 2). In FIG. 4, an output $l_p$ from the block $P_s$ is a vector representing the drive displacement of a wire. Also, in the continuum robot control system 300-1 illustrated in FIG. 4, a block $K_s$ represents a position control system for settling to a target drive displacement $l_{pref}$ of the wire.

Also, in the continuum robot control system 300-1 illustrated in FIG. 4, a block $P_l$ represents an operating system (following operating means), including a motor, for operating a following bending section. In the example illustrated in FIG. 3, the block $P_l$ is, for example, an operating system corresponding to the second operating unit 220 and the first operating unit 210 for operating the second bending section 172 and the first bending section 171 (following bending sections). Also, in FIG. 4, $d_{\theta lf}$ denotes an operating torque the operator applies to the operating lever for the bending angle of the following bending section and $d_{\zeta lf}$ denotes an operating torque the operator applies to the operating lever for the rotational angle of the following bending section. In FIG. 4, a target bending angle $\theta_{lf}$ and a target rotational angle $\zeta_{lf}$ of the following bending section, which are outputs of the block $P_l$, are angles of the operating levers in the second operating unit 220 and the first operating unit 210 for controlling the bending angle and the rotational angle of the following bending sections. Also, in FIG. 4, a block $K_l$ is a position control system for settling these angles to target values. Blocks $G_{in}$ and $G_{out}$ connected to an input end and an output end, respectively, of the block $K_l$ are gains that take values from 0 to 1.

In the continuum robot control system 300-1 illustrated in FIG. 4, an input device 310 is a device that provides a block FTL and a kinematic computing unit 340 with a target bending angle $\theta_{lt}$ and a target rotational angle $\zeta_{lt}$ of the distal-most bending section (or third bending section 173 in the example illustrated in FIG. 1). The target bending angle $\theta_{lt}$ and the target rotational angle $\zeta_{lt}$ of the distal-most bending section, which are outputs of the input device 310, are angles of the operating levers 231 and 234 in the third operating unit 230 for controlling the bending angle and the rotational angle of the distal-most bending section. In the present embodiment, the operating levers 231 and 234 included in the third operating unit 230, illustrated in FIG. 3, for operating the third bending section 173 (distal-most bending section) are not motor-driven.

In the continuum robot control system 300-1 illustrated in FIG. 4, an input device 320 is a device that provides the block FTL with the displacement $z_b$ of the base 140 in the direction of movement (e.g., forward movement) of the continuum robot 100.

In the continuum robot control system 300-1 illustrated in FIG. 4, the block FTL represents an exemplary configuration of a follow-the-leader control algorithm. The block FTL is following calculating means that calculates the target bending angle $\theta_{lFTL}$ and the target rotational angle $\zeta_{lFTL}$ of the following bending section on the basis of the target bending angle $\theta_{lt}$ and the target rotational angle $\zeta_{lt}$ of the distal-most bending section received from the input device 310 and the displacement $z_b$ of the base 140 received from the input device 320. Specifically, the target bending angle $\theta_{lFTL}$ and the target rotational angle $\zeta_{lFTL}$ are vectors of target values of a follow-the-leader control system for the following bending section.

In the continuum robot control system 300-1 illustrated in FIG. 4, a switch unit 330 includes a first switch 331 and a second switch 332. The first switch 331 is a switch (following switching means) that performs a switching operation for selecting the target bending angle $\theta_{lFTL}$ and the target rotational angle $\zeta_{lFTL}$ of the following bending section obtained from the block FTL, or the target bending angle $\theta_{lf}$ and the target rotational angle $\zeta_{lf}$ of the following bending section obtained from the block $P_l$. The second switch 332 is a switch that receives a "0" or "1" signal and performs switching in accordance with the input signal. During follow-the-leader control (specifically, while the "1" signal is being received by the second switch 332), the switch unit 330 is in the state of a double-pole double-throw switch illustrated in FIG. 4. That is, during the follow-the-leader control described above, the first switch 331 performs a switching operation for selecting the target bending angle $\theta_{lFTL}$ and the target rotational angle $\zeta_{lFTL}$ of the following bending section obtained from the block FTL. When operator's contact with the operating lever for the following bending section is detected (specifically, when the second switch 332 receives the "0" signal), the control system of the present embodiment causes the switch unit 330 to reverse the position of the double-pole double-throw switch illustrated in FIG. 4. That is, when operator's contact with the operating lever for the following bending section is detected as described above, the first switch 331 performs a switching operation for selecting the target bending angle $\theta_{lf}$ and the target rotational angle $\zeta_{lf}$ of the following bending section obtained from the block $P_l$. This allows seamless transition from the follow-the-leader control to addition of an operator's operation onto the attitude (bending shape) of the continuum robot 100.

In the continuum robot control system 300-1 illustrated in FIG. 4, the kinematic computing unit (kinematics) 340 is computing means that computes, on the basis of the target bending angle $\theta$ and the target rotational angle $\zeta$ of the following bending section selected by the first switch 331, the target drive displacement $l_{pref}$ by which the driving unit of the continuum robot 100 drives the wire in the following bending section. Additionally, in the present embodiment, the kinematic computing unit 340 also computes, on the basis of the target bending angle $\theta_{lt}$ and the target rotational angle $\zeta_{lt}$ of the distal-most bending section received from the input device 310, the target drive displacement $l_{pref}$ by which the driving unit of the continuum robot 100 drives the wire in the distal-most bending section.

1) Modeling

In the present chapter, kinematics is derived to determine the target drive displacement by which the actuator drives the wire to control the bending angle $\theta$ and the rotational angle $\zeta$ of the continuum robot 100. Definitions of symbols used in the present chapter are as follows:

$l_d$: length of central axis of bending section
$\theta_n$: bending angle of distal end
$\zeta_n$: rotational angle of distal end
$\rho_n$: radius of curvature of bending section In the present embodiment, as described above, three wires for the bending sections, corresponding to the three wires 111, 112, and 113 illustrated in FIG. 2, are referred to as Wire a, Wire b, and Wire c, respectively, counterclockwise in the xy plane. The drive displacements of Wires a to c that drive the n-th bending section are referred to as $l_{pna}$, $l_{pnb}$, and $l_{pnc}$.

Figure 5:
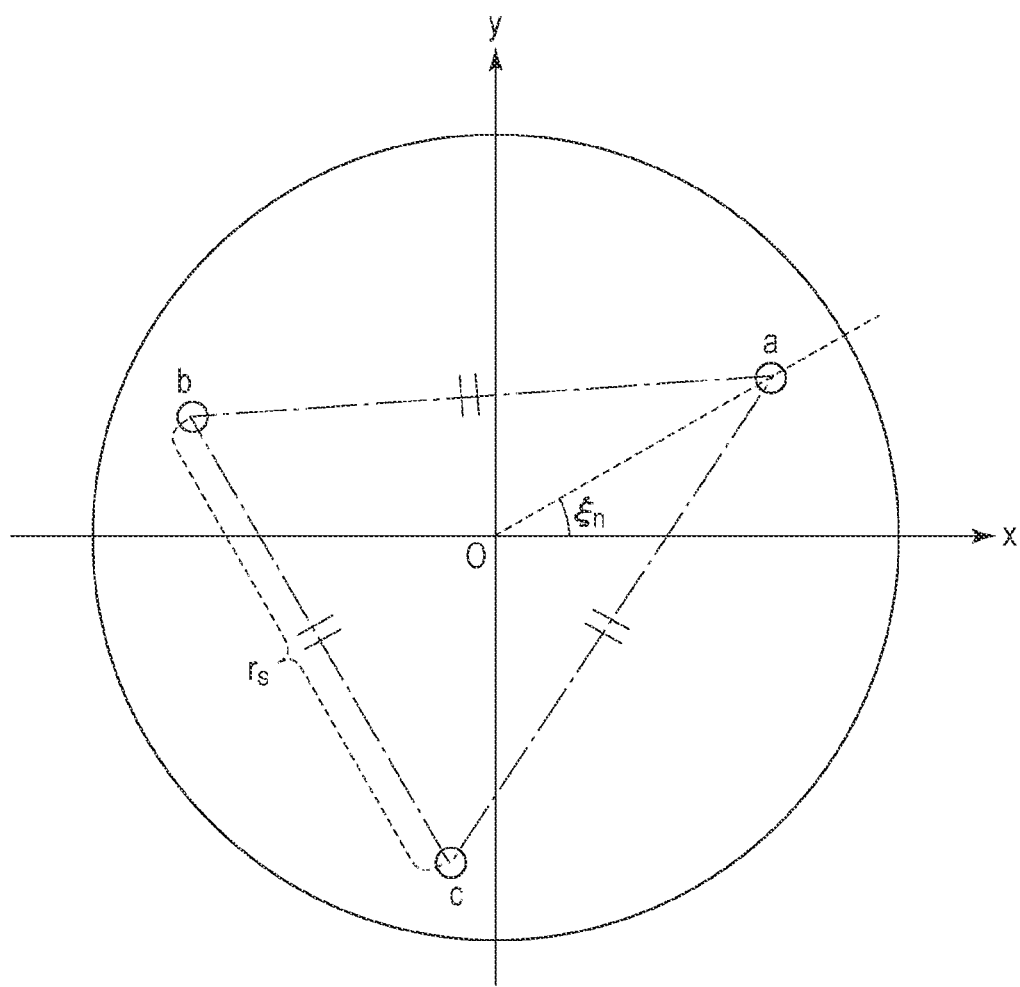
FIG. 5 is a diagram illustrating an example of how three wires (Wires a to c) for the n-th bending section, corresponding to three wires illustrated in FIG. 2, are arranged in an xy plane.

FIG. 5 is a diagram illustrating an example of how the three wires (Wires a to c) for the n-th bending section, corresponding to the three wires 111 to 113 illustrated in FIG. 2, are arranged in the xy plane. As illustrated in FIG. 5, Wires a to c are arranged at the vertices of a regular triangle with a length of $r_s$ on each side. A phase angle $\xi_n$ in FIG. 5 is an angle that determines the position of the wire that drives the n-th bending section. The phase angle $\xi_1$ is zero ($\xi_1=0$) in the present embodiment.

The kinematics of the continuum robot 100 is derived on the following assumptions:

1. In each bending section, the wires deform with a constant curvature;
2. Torsional deformation of the wires is not taken into account;
3. The wires do not deform in the longitudinal direction; and
4. Friction between the wire guides and the wires is not taken into account.

First, a relation between each of the drive displacements $l_{p1a}$, $l_{p1b}$, and $l_{p1c}$ of Wires a to c in the first bending section (corresponding to the bending section 171 in FIG. 1 and FIG. 2) and the bending angle $\theta_1$ and the rotational angle $\zeta_1$ of the distal end of the first bending section is represented by Equation (1):

$$l_{p1a} = \frac{r_s}{\sqrt{3}} \cos \zeta_1 \theta_1 \qquad (1)$$

$$l_{p1b} = \frac{r_s}{\sqrt{3}} \cos\left(\frac{\pi}{6} + \zeta_1\right)\theta_1$$

$$l_{p1c} = \frac{r_s}{\sqrt{3}} \cos\left(\frac{\pi}{6} - \zeta_1\right)\theta_1$$

Next, a relation between each of the drive displacements $l_{pna}$, $l_{pnb}$, and $l_{pnc}$ of Wires a to c in the n-th bending section of the plurality of bending sections of the continuum robot 100 and the bending angle $\theta_n$ and the rotational angle $\zeta_n$ of the distal end of the n-th bending section is determined. The phase angle $\xi_n$ of the wire that drives the n-th bending section is represented by Equation (2):

$$\xi_n = \frac{120}{e}n \qquad (2)$$

where e is the number of bending sections.

The drive displacements $l_{pna}$, $l_{pnb}$, and $l_{pnc}$ of Wires a to c in the n-th bending section are thus represented by Equation (3):

$$l_{pna} = \frac{r_s}{\sqrt{3}} \cos(\zeta_n - \xi_n)\theta_n \qquad (3)$$

$$l_{pnb} = \frac{r_s}{\sqrt{3}} \cos\left(\frac{\pi}{6} + \zeta_n - \xi_n\right)\theta_n$$

$$l_{pnc} = \frac{r_s}{\sqrt{3}} \cos\left(\frac{\pi}{6} - \zeta_n + \xi_n\right)\theta_n$$

Next, modeling of the operating device 200-1 illustrated in FIG. 3 is performed.

The equation of motion is expressed as Equation (4):

$$\begin{bmatrix} J_{\theta 1} & & & & 0 \\ & \ddots & & & \\ & & J_{\theta n} & & \\ & & & J_{\zeta 1} & \\ & & & & \ddots \\ 0 & & & & J_{\zeta n} \end{bmatrix} \begin{bmatrix} \ddot{\theta}_{l1} \\ \vdots \\ \ddot{\theta}_{ln} \\ \ddot{\zeta}_{l1} \\ \vdots \\ \ddot{\zeta}_{ln} \end{bmatrix} = \begin{bmatrix} d_{\theta 1} \\ \vdots \\ d_{\theta n} \\ d_{\zeta 1} \\ \vdots \\ d_{\zeta n} \end{bmatrix} + \begin{bmatrix} u_{\theta 1} \\ \vdots \\ u_{\theta n} \\ u_{\zeta 1} \\ \vdots \\ u_{\zeta n} \end{bmatrix} \qquad (4)$$

where $J_{\theta_n}$ is the moment of inertia of the operating lever for setting the bending angle $\theta_n$ of the n-th bending section and the motor for the operating lever, $J_{\zeta_n}$ is the moment of inertia of the operating lever for setting the rotational angle $\zeta_n$ of the n-th bending section and the motor for the operating lever, $d_{\theta_n}$ is an operating torque applied by the operator to the operating lever for setting the bending angle $\theta_n$ of the n-th bending section, $d_{\zeta_n}$ is an operating torque applied by the operator to the operating lever for setting the rotational angle $\zeta_n$ of the n-th bending section, $u_{\theta_n}$ is a control torque applied to the operating lever for setting the bending angle $\theta_n$ of the n-th bending section, and $u_{\zeta_n}$ is a control torque applied to the operating lever for setting the rotational angle $\zeta_n$ of the n-th bending section.

When Equation (4) is expressed as Equation (5) below, $$J_l \ddot{q} = d_v + u_v \qquad (5)$$

the equation of state is expressed as Equation (6) below:

$$\dot{x}_l = A_l x_l + H_l d_v + B_l u_v, x_l = [q, \dot{q}]^T \qquad (6)$$

The amount of observation $y_l$ is represented by an output equation, Equation (7) below:

$$y_l = [I_{1\times 2n} 0_{1\times 2n}] x_l = C_g x_l \qquad (7)$$

2) Design of Control System

The present chapter deals with design of a follow-the-leader control system and a control system for observation motion control performed in the process of follow-the-leader control.

Figure 6:
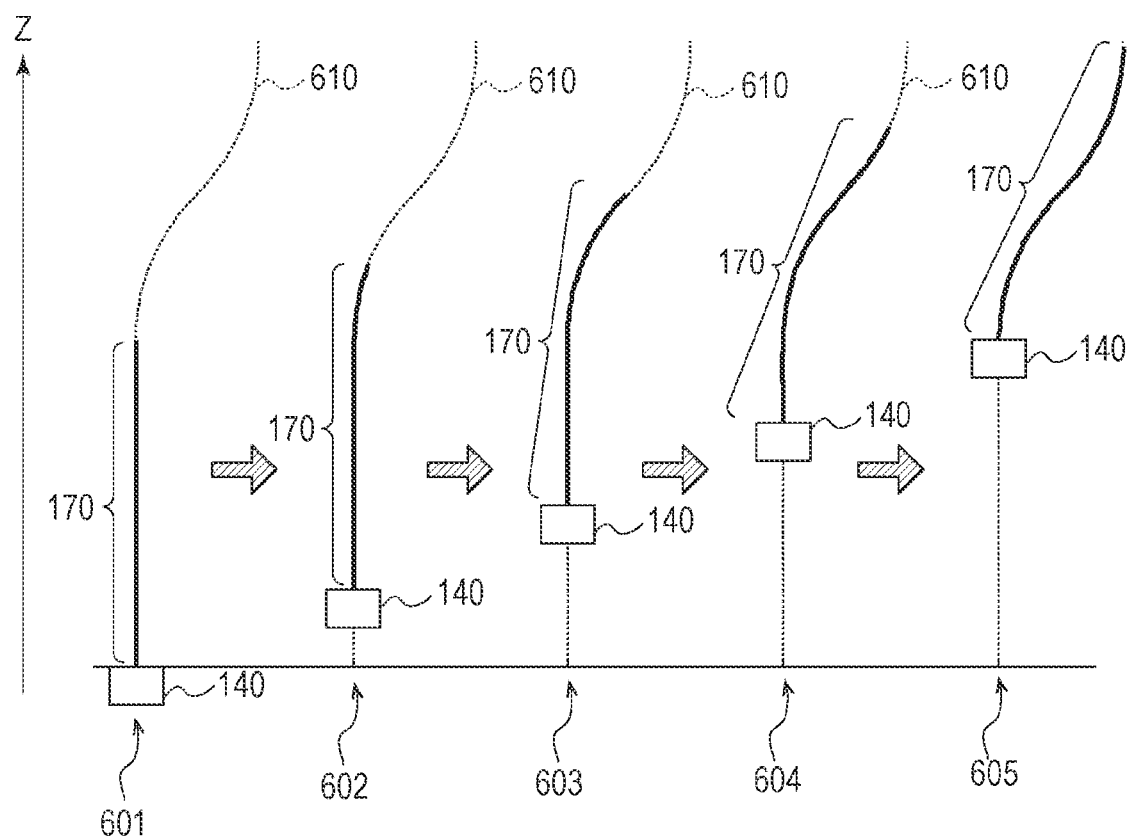
FIG. 6 is a diagram illustrating an example of follow-the-leader control of the continuum robot according to the first embodiment of the present disclosure.

FIG. 6 is a diagram illustrating an example of follow-the-leader control of the continuum robot 100 according to the first embodiment of the present disclosure. In FIG. 6, the same elements as those in FIG. 1 are denoted by the same reference numerals. Also, the z direction in FIG. 1 is the upward direction from the lower side of the drawing of FIG. 6. Dotted lines in FIG. 6 each indicate a target path 610 along which the continuum robot 100 including the base 140 and the bendable portion 170 moves.

As illustrated in FIG. 6, the follow-the-leader control is a method that performs control in such a way that the following bending section of the bendable portion 170 passes along the path (target path 610) along which the distal-most bending section of the bendable portion 170 passes.

Examples of the follow-the-leader control include control that is performed in such a way that the bending angle of a following bending section corresponding to forward movement of the continuum robot 100 reaches a first target bending angle of a distal-most bending section received, in accordance with a profile of a first bending angle related to the bending angle of the following bending section and determined in accordance with the first target bending angle.

In FIG. 6, a time point 601 corresponds to an initial state where the bendable portion 170 extending from the upper surface 141 of the base 140 in the z direction does not bend. Then, as time passes from a time point 602, a time point 603, a time point 604, and a time point 605 in FIG. 6, the bendable portion 170 bends as the base 140 moves in the z direction.

The follow-the-leader control thus allows the continuum robot 100 to move in such a way as to pass through a space. It is not essential for the follow-the-leader control to determine the target path 610 in advance. For example, the bending angle of the distal-most bending section may be continuously transmitted to the bending angle of the following bending section along the length of the bending section. With this method, for example, by giving a command with a joystick to the bending angle of the distal-most bending section and the displacement (or the amount of movement (forward movement)) of the base 140, the operator can perform the follow-the-leader control of the continuum robot 100 in real time.

2.1) Follow-the-Leader Control

Figure 7A:
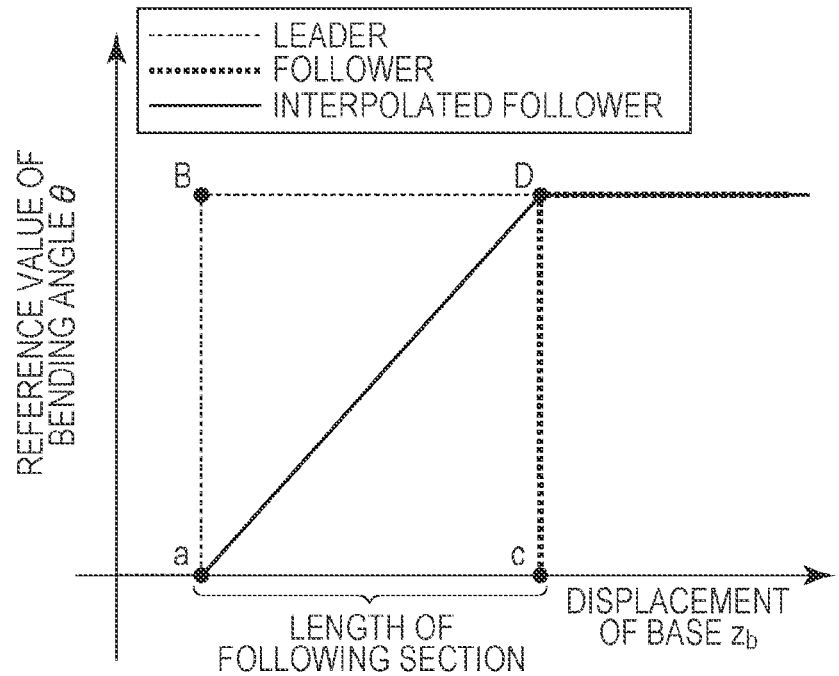
FIG. 7A is a diagram illustrating an example of how a block FTL illustrated in FIG. 4 calculates a target bending angle of a following bending section, according to the first embodiment of the present disclosure.
Figure 7B:
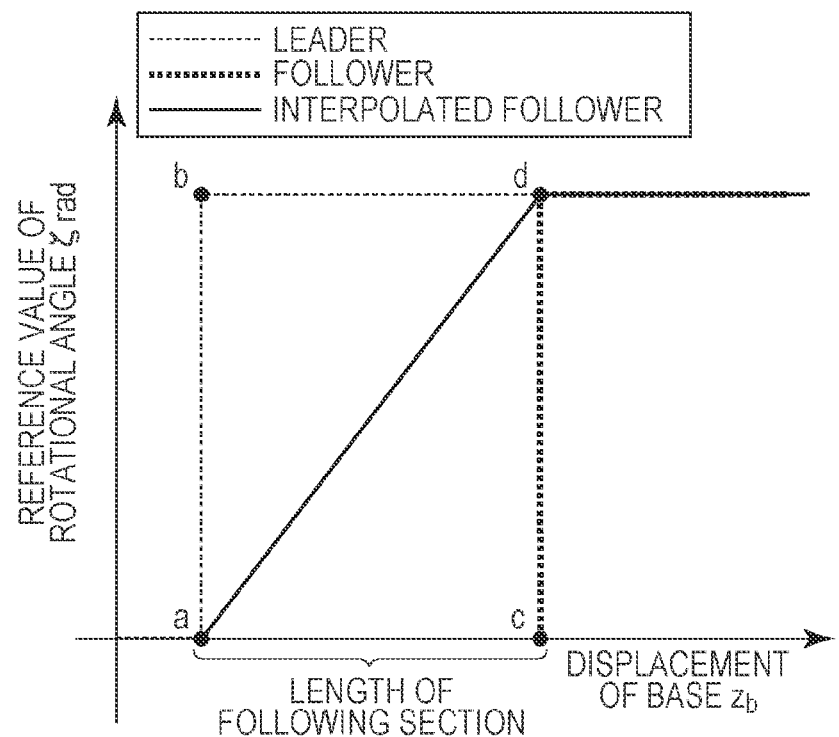
FIG. 7B is a diagram illustrating an example of how the block FTL illustrated in FIG. 4 calculates a target rotational angle of the following bending section, according to the first embodiment of the present disclosure.

FIG. 7A and FIG. 7B are diagrams illustrating an example of how the block FTL illustrated in FIG. 4 calculates the target bending angle $\theta_{fFTL}$ and the target rotational angle $\zeta_{fFTL}$ of the following bending section, according to the first embodiment of the present disclosure. The example illustrated in FIG. 7A and FIG. 7B assumes that the distal-most bending section is the bending section 173 illustrated in FIG. 1 and the following bending section is the bending section 172 illustrated in FIG. 1.

Coordinates in the graphs of FIG. 7A and FIG. 7B represent a pair of the position of the base 140 and the angle of the bending section. For the purposes of explanation, an angle corresponding to coordinates "a" may be referred to as an angle "a", and the position (displacement) of the base 140 corresponding to coordinates "a" may be referred to as a position "a" (displacement "a").

In FIG. 7A, the horizontal axis represents the displacement $z_b$ of the base 140 and the vertical axis represents the bending angle $\theta$ of the distal-most bending section and the following bending section. In FIG. 7A, "Leader" indicated by a broken line represents a profile of the bending angle of the distal-most bending section corresponding to the target bending angle $\theta_{lt}$ of the distal-most bending section, for example, the operator has entered through the input device 310. Also, in FIG. 7A, "Follower" indicated by a thick broken line represents a profile of the bending angle of the following bending section corresponding to, for example, the target bending angle $\theta_{lf}$ of the following bending section.

In FIG. 7B, the horizontal axis represents the displacement $z_b$ of the base 140 and the vertical axis represents the target rotational angle $\zeta$ of the distal-most bending section and the following bending section. In FIG. 7B, "Leader" indicated by a broken line represents a profile of the rotational angle related to the target rotational angle $\zeta_{lt}$ of the distal-most bending section, for example, the operator has entered through the input device 310. Also, in FIG. 7B, "Follower" indicated by a thick broken line represents a profile of the rotational angle related to, for example, the target rotational angle $\zeta_{lf}$ of the following bending section.

Referring to FIG. 7A, when the displacement $z_b$ of the base 140 is a displacement "a", if the target bending angle $\theta_{lt}$ of the distal-most bending section is changed from a distal-most bending angle "a" to a distal-most bending angle "B", for example, the target bending angle $\theta_{lf}$ of the following bending section represented by "Follower", indicated by a thick broken line, is automatically updated to change from a following bending angle "c" to a following bending angle "D" when the displacement $z_b$ of the base 140 is a displacement "c". Referring to FIG. 7B, when the displacement $z_b$ of the base 140 is a displacement "a", if the target rotational angle $\zeta_{lt}$ of the distal-most bending section is changed from a distal-most rotational angle "a" to a distal-most rotational angle "b", for example, the target rotational angle $\zeta_{lf}$ of the following bending section represented by "Follower", indicated by a thick broken line, is automatically updated to change from a following rotational angle "c" to a following rotational angle "d" when the displacement $z_b$ of the base 140 is a displacement "c". The displacement "c" is determined in such a way that the length between the displacement "a" and the displacement "c" is equal to the length $l_d$ of the following bending section.

When the displacement $z_b$ of the base 140 is between the displacement "a" and the displacement "c" in FIG. 7A and FIG. 7B, however, the target bending angle $\theta_{lf}$ and the target rotational angle $\zeta_{lf}$ of the following bending section represented by "Follower", indicated by a thick broken line, do not change. The target bending angle $\theta_{lf}$ of the following bending section represented by "Follower", indicated by a thick broken line in FIG. 7A, changes from the following bending angle "c" to the following bending angle "D" at the displacement "c", and the target rotational angle $\zeta_{lf}$ of the following bending section, indicated by a thick broken line in FIG. 7B, changes from the following rotational angle "c" to the following rotational angle "d" at the displacement "c". The continuum robot 100 thus behaves abruptly and the operability of the continuum robot 100 is lost.

Accordingly, in the present embodiment, the block FTL illustrated in in FIG. 4 calculates the target bending angle $\theta_{fFTL}$ and the target rotational angle $\theta_{fFTL}$ of the following bending section in the manner described below.

In FIG. 7A, the target bending angle $\theta$ between the displacement "a" and the displacement "c" is interpolated by a line that connects the target bending angle "a" at the displacement "a" and the target bending angle "D" at the displacement "c", so that the block FTL in FIG. 4 calculates the resulting angle as the target bending angle $\theta_{fFTL}$ of the following bending section. In FIG. 7A, the interpolated portion is indicated by a solid line. Similarly, in FIG. 7B, the target rotational angle $\zeta$ between the displacement "a" and the displacement "c" is interpolated by a line that connects the target rotational angle "a" at the displacement "a" and the target rotational angle "d" at the displacement "c", so that the block FTL in FIG. 4 calculates the resulting angle as the target rotational angle $\zeta_{fFTL}$ of the following bending section. In FIG. 7B, the interpolated portion is indicated by a solid line. Then, the block FTL in FIG. 4 stores the profile of the bending angle related to the calculated target bending angle $\theta_{fFTL}$ of the following bending section and the profile of the rotational angle related to the calculated target rotational angle $\zeta_{fFTL}$ of the following bending section, for example, in an internal storage unit.

The explanation of FIG. 7 assumes that the distal-most bending section is the bending section 173 illustrated in FIG. 1 and the following bending section is the bending section 172 illustrated in FIG. 1. When the bendable portion 170 of the continuum robot 100 includes three or more bending sections, that is, when, for example, the bendable portion 170 illustrated in FIG. 1 includes three bending sections, and the bending section 171 illustrated in FIG. 1 is used as the following bending section, the immediately preceding bending section 172 illustrated in FIG. 1 can be used as the distal-most bending section.

2.2) Control for Switching to Observation Motion Control

The follow-the-leader control system described in the previous chapter "2.1) Follow-the-leader control" allows the operator to control the attitudes of all the following bending sections simply by giving an angle command to the distal-most bending section. Depending on the condition of the target path 610, however, the operator may be required to perform observation motion control in the middle. This can be performed by giving an additional command to the attitude of the following bending section. For example, the attitude of the third bending section 173 does not change when the actuator for the second bending section 172 alone is driven. This motion can change the position of the distal-most end of the bendable portion 170 while keeping constant the direction of the leading end of the third bending section 173, and is suitable for observation along walls, such as stomach and intestinal walls, that extend obliquely from the direction of movement of the continuum robot 100 (hereinafter referred to as "oblique motion"). Here, the operator adds a command value to the bending attitude set by the follow-the-leader control system. For example, if the operating system for giving an additional command is a midpoint return lever, it is difficult to keep track of the bending shape set by the follow-the-leader control, and incorrect operation may damage the continuum robot 100 or the object therearound. Also, the amount of additional operation is reset when the operator's hand is off the operating lever. If, for example, the operating system that gives an additional command is a system that gives a bending angular velocity, keeping track of the resulting bending angle is indirect and thus is difficult, although the amount of additional operation is not reset. To solve this, it is desirable that during the follow-the-leader control, the angle of the operating lever be synchronized with the bending angle or the rotational angle. Accordingly, in the present embodiment, an operating system including a motor and an angular sensor, such as an encoder, is used as the operating device 200-1. This allows the operator to keep track of the attitude of the continuum robot 100 set by the follow-the-leader control, so that the operator can add a command value simply by giving an operating torque to the operating lever.

Further description of FIG. 4 will now be provided.

Hereinafter, a relation between the continuum robot control system 300-1 illustrated in FIG. 4, and the model described in "1) Modeling" and the follow-the-leader control system described in "2.1) Follow-the-leader control", will be described.

As described with reference to FIG. 4, the block $P_s$ is the continuum robot 100 to be controlled, the output $l_p$ from the block $P_s$ is a vector representing the drive displacement of a wire, and the block $K_s$ is a position control system for settling to the target drive displacement $l_{pref}$ of the wire. The block $P_l$ is an operating system including a motor represented by Equation (4), the block $K_l$ is a position control system for settling to target values, and the blocks $G_{in}$ and $G_{out}$ connected to the input end and the output end of the position control system are gains that take values from 0 to 1. In the present embodiment, as described above, the operating levers included in the operating unit for operating the distal-most bending section are not motor-driven.

The target bending angle $\theta_{lt}$ and the target rotational angle $\zeta_{lt}$ of the distal-most bending section are, for example, the angles of the operating levers for the bending angle and the rotational angle of the distal-most bending section and are equal to $\theta_{ln}$ and $\zeta_{in}$ in Equation (4). Also, the target bending angle $\theta_{lf}$ and the target rotational angle $\zeta_{lf}$ of the following bending section are, for example, the angles of the operating levers for the bending angle and the rotational angle of the following bending section, and are vectors constituted by $[\theta_{l1}, \ldots, \theta_{ln-1}, \zeta_{l1}, \ldots, \zeta_{ln-1}]$ in Equation (4). Also, as described above, the operating torques $d_{\theta_{lf}}$ and $d_{\zeta_{lf}}$ are operating torques the operator applies to the operating levers for the bending angle and the rotational angle of the following bending section, and are vectors constituted by $[d_{\theta_1}, \ldots, d_{\theta_{n-1}}, \ldots, d_{\zeta_1}, \ldots, d_{\zeta_{n-1}}]$ in Equation (4).

As described above, during follow-the-leader control (specifically, while the "1" signal is being received by the second switch 332), the switch unit 330 is in the state of the double-pole double-throw switch illustrated in FIG. 4. In this case, the kinematic computing unit 340 receives the target bending angle $\theta_{lFTL}$ and the target rotational angle $\zeta_{lFTL}$ of the following bending section for the follow-the-leader control system, output from the block FTL. At the same time, since the target bending angle $\theta_{lFTL}$ and the target rotational angle $\zeta_{lFTL}$ of the following bending section for the follow-the-leader control system are target angles of the operating levers and the block $G_{in}$ and the block $G_{out}$ receive a value of 1, the angles of the operating levers are feedback-controlled by the block $K_l$ to follow the target bending angle $\theta_{lFTL}$ and the target rotational angle $\zeta_{lFTL}$ of the following bending section. In this case, the operating torques $d_{\theta_{lf}}$ and $d_{\zeta_{lf}}$ applied to the operating levers are suppressed as disturbance, and thus have little impact on the angles $\theta_{lf}$ and $\zeta_{lf}$ of the operating levers.

When operator's contact with the operating lever for the following bending section is detected (specifically, when the second switch 332 receives the "0" signal), the switch unit 330 reverses the position of the double-pole double-throw switch illustrated in FIG. 4. Since the block $G_{in}$ and the block $G_{out}$ receive a value of 0 in this case, the control system for the operating levers is shut off, and the operating torques $d_{\theta_{lf}}$ and $d_{\zeta_{lf}}$ can vary the angles $\theta_{lf}$ and $\zeta_{lf}$ of the operating levers. At the same time, the kinematic computing unit 340 receives the angles $\theta_{lf}$ and $\zeta_{lf}$ of the operating levers. This allows seamless transition from the follow-the-leader control to addition of an operator's operation onto the attitude of the continuum robot 100. Then, when operator's contact with the operating lever for the following bending section becomes undetected again (specifically, when the second switch 332 receives the "1" signal), the switch unit 330 switches to the position of the double-pole double-throw switch illustrated in FIG. 4. The angles of the continuum robot 100 and the operating levers are thus returned to the attitude set by the follow-the-leader control. Although the attitude angle of the continuum robot 100 is equal to the angles of the operating levers in the present embodiment, the configuration is not limited to this and, for example, one angle may be a multiple of the other.

3) Simulation

In the present chapter, simulations are performed using the follow-the-leader control system described in the previous chapter "2) Design of control system". The continuum robot 100 illustrated in FIG. 1 is simulated, which includes the bendable portion 170 having three bending sections with a length of 0.01 m.

FIG. 8A to FIG. 8F are diagrams illustrating a first example of a result of simulation of a method of controlling the continuum robot 100 by the continuum robot control system 300-1 according to the first embodiment of the present disclosure. In FIG. 8A to FIG. 8F, the horizontal direction corresponds to the x direction in FIG. 1, and the vertical direction corresponds to the z direction in FIG. 1. FIG. 8A to FIG. 8F illustrate how the motion control of the bending sections 171 to 173 in the bendable portion 170 of the continuum robot 100 proceeds with time. Specifically, FIG. 8A to FIG. 8F are stick diagrams that illustrate, in a stepwise manner, how the attitude of the bendable portion 170 is controlled by the follow-the-leader control and the additional operation until the base 140 advances 0.02 m. In FIG. 8A to FIG. 8F, a solid line represents the shape of the bendable portion 170 of the continuum robot 100, an open circle represents the leading end of each bending section, and a thin line represents the locus of the leading end of each bending section.

Figure 8A:
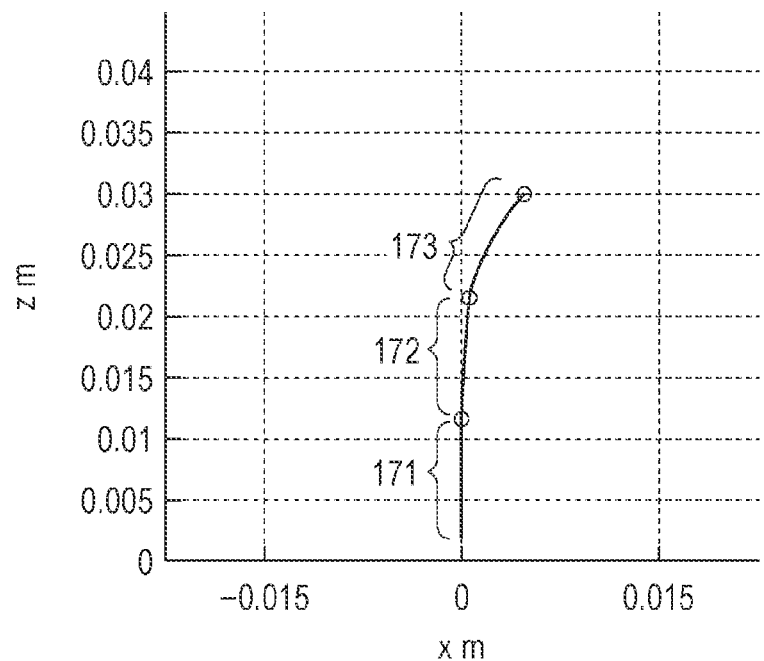
FIG. 8A is a diagram illustrating a first example of a result of simulation of a continuum robot control method by the continuum robot control system according to the first embodiment of the present disclosure.
Figure 8B:
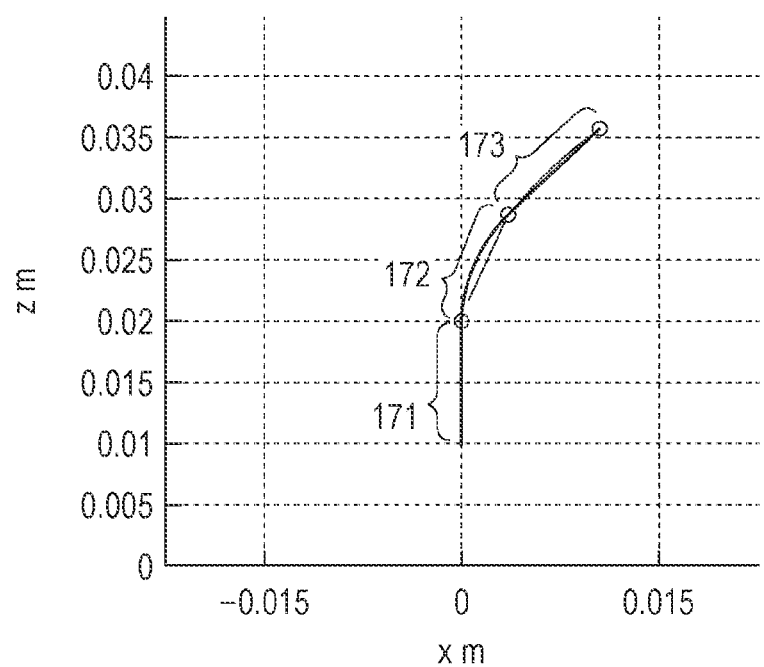
FIG. 8B is another diagram illustrating the first example of the result of simulation of the continuum robot control method by the continuum robot control system according to the first embodiment of the present disclosure.

First, FIG. 8A illustrates an attitude where the third bending section 173 (distal-most bending section) is bent and the base 140 is started to move by an operator's bending operation. FIG. 8B shows that when the base 140 is moved further by the operator, the follow-the-leader control system allows the second bending section 172 to follow the third bending section 173.

Figure 8C:
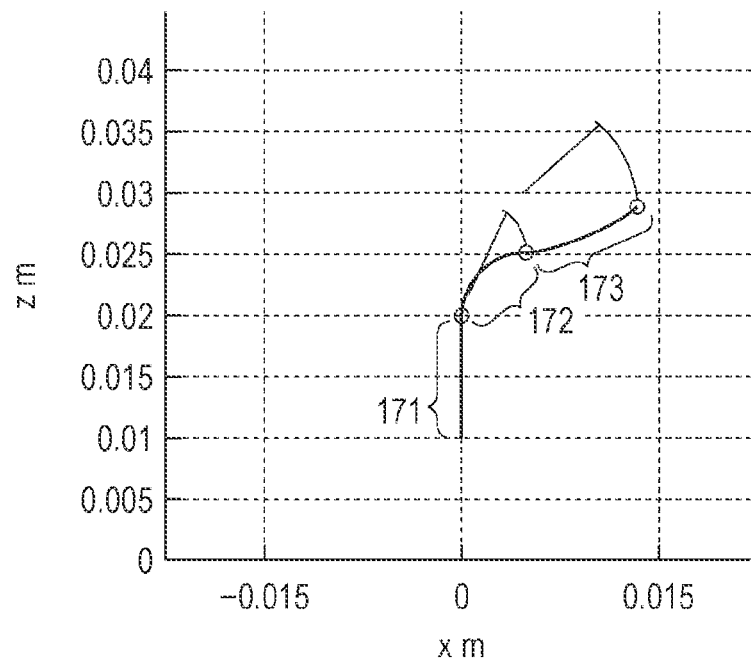
FIG. 8C is another diagram illustrating the first example of the result of simulation of the continuum robot control method by the continuum robot control system according to the first embodiment of the present disclosure.
Figure 8D:
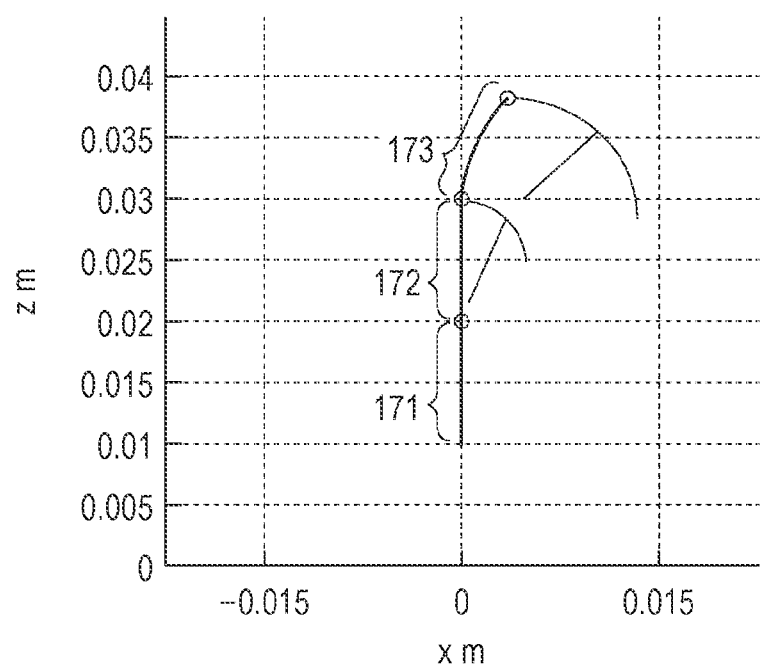
FIG. 8D is another diagram illustrating the first example of the result of simulation of the continuum robot control method by the continuum robot control system according to the first embodiment of the present disclosure.

FIG. 8C illustrates motion control based on an operator's operation of the operating lever at the bending angle θ of the second bending section 172. This causes the switch unit 330 to reverse the position of the double-pole double-throw switch illustrated in FIG. 4, so that the attitude illustrated in FIG. 8C is reached by adding an operation to the attitude set by the follow-the-leader control. FIG. 8D illustrates an attitude reached by an additional operation in the direction of shallowing the bending angle θ of the second bending section 172. This shows that an oblique motion can be performed which changes the position of the distal-most end of the bendable portion 170 while keeping constant the direction of the leading end of the third bending section 173.

Figure 8E:
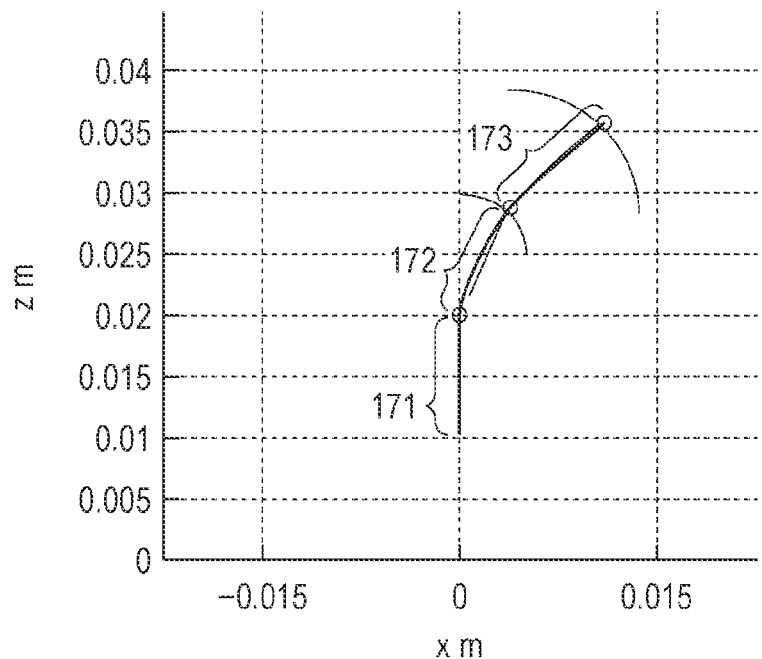
FIG. 8E is another diagram illustrating the first example of the result of simulation of the continuum robot control method by the continuum robot control system according to the first embodiment of the present disclosure.
Figure 8F:
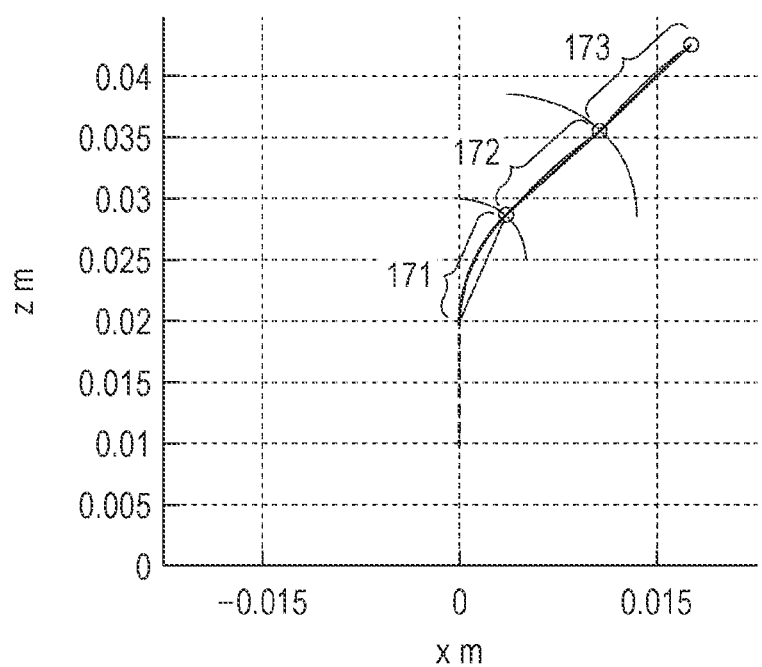
FIG. 8F is another diagram illustrating the first example of the result of simulation of the continuum robot control method by the continuum robot control system according to the first embodiment of the present disclosure.

In FIG. 8E, the operator's operation of the operating lever at the bending angle θ of the second bending section 172 ends and the attitude before the additional operation is resumed. FIG. 8F then shows that as the base 140 moves further, the follow-the-leader control can continue, which allows the second bending section 172 and the first bending section 171 to follow the third bending section 173 and the second bending section 172, respectively.

FIG. 9A to FIG. 9F are diagrams illustrating a second example of the result of simulation of the method of controlling the continuum robot 100 by the continuum robot control system 300-1 according to the first embodiment of the present disclosure. In FIG. 9A to FIG. 9F, the horizontal direction corresponds to the y direction in FIG. 1, the vertical direction corresponds to the z direction in FIG. 1, and the depth direction corresponds to the x direction in FIG. 1. FIG. 9A to FIG. 9F illustrate how the motion control of the bending sections 171 to 173 in the bendable portion 170 of the continuum robot 100 proceeds with time. Specifically, FIG. 9A to FIG. 9F illustrate a simulation response of giving an additional operation to the rotational angle ζ.

Figure 9A:
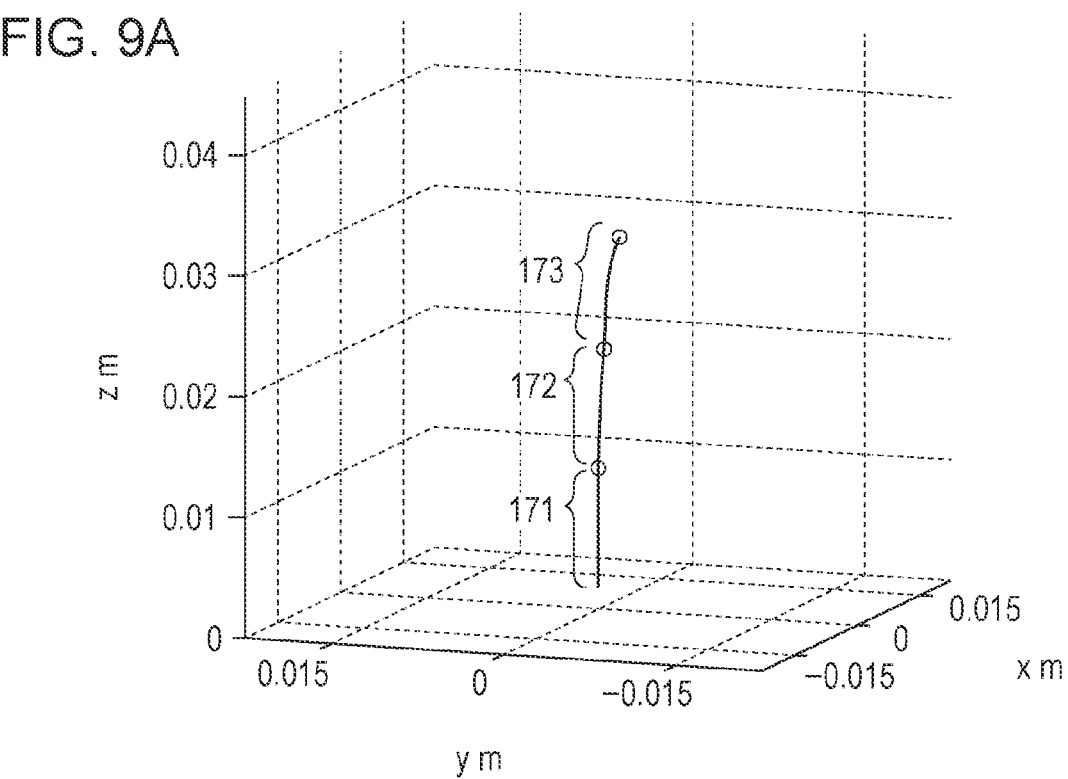
FIG. 9A is a diagram illustrating a second example of the result of simulation of the continuum robot control method by the continuum robot control system according to the first embodiment of the present disclosure.
Figure 9B:
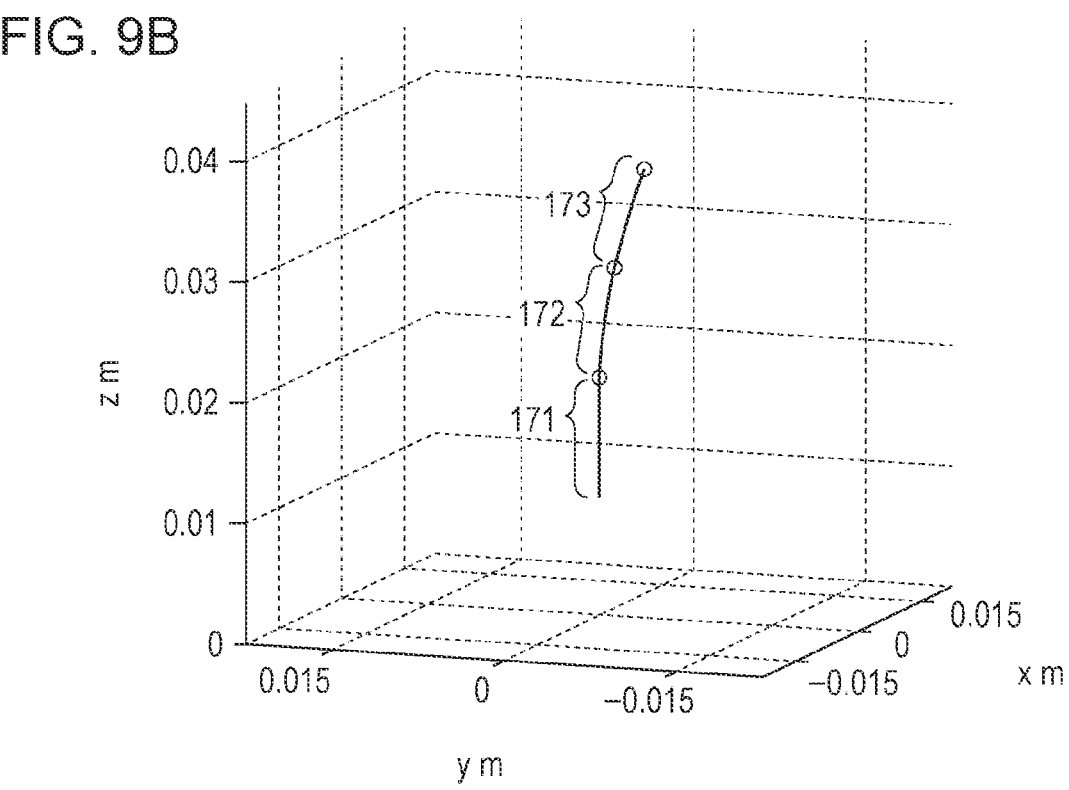
FIG. 9B is another diagram illustrating the second example of the result of simulation of the continuum robot control method by the continuum robot control system according to the first embodiment of the present disclosure.

In FIG. 9A and FIG. 9B, follow-the-leader control is performed in the same manner as that illustrated in FIG. 8A and FIG. 8B.

Figure 9C:
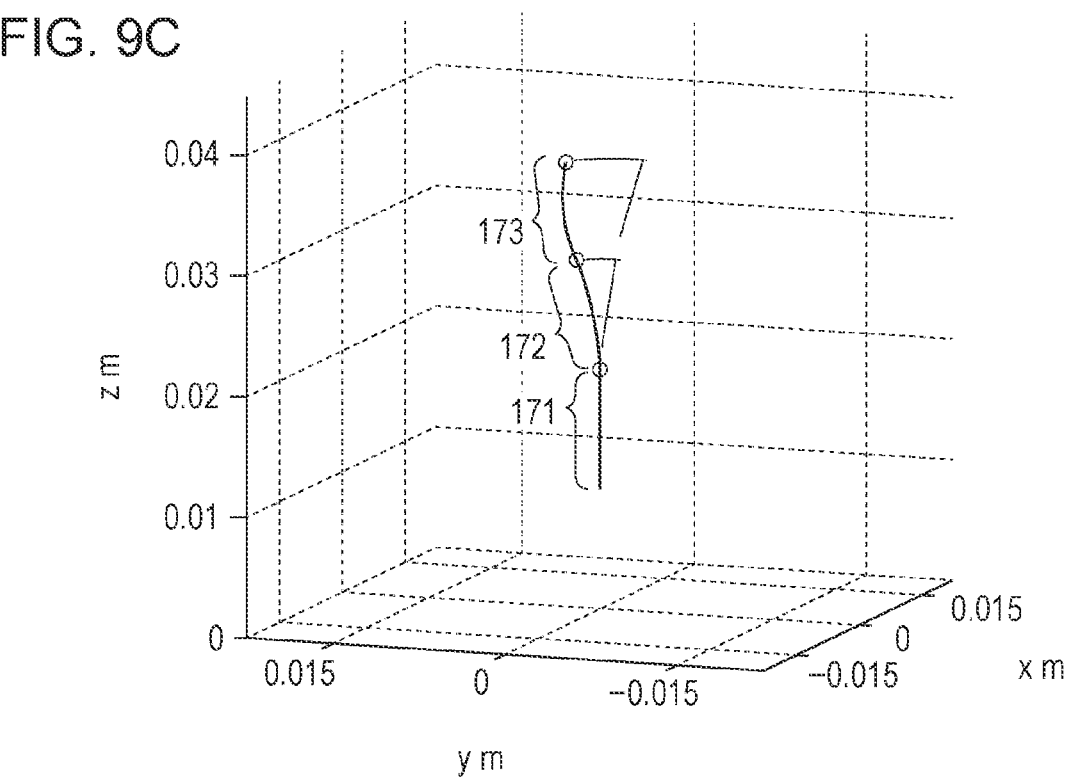
FIG. 9C is another diagram illustrating the second example of the result of simulation of the continuum robot control method by the continuum robot control system according to the first embodiment of the present disclosure.
Figure 9D:
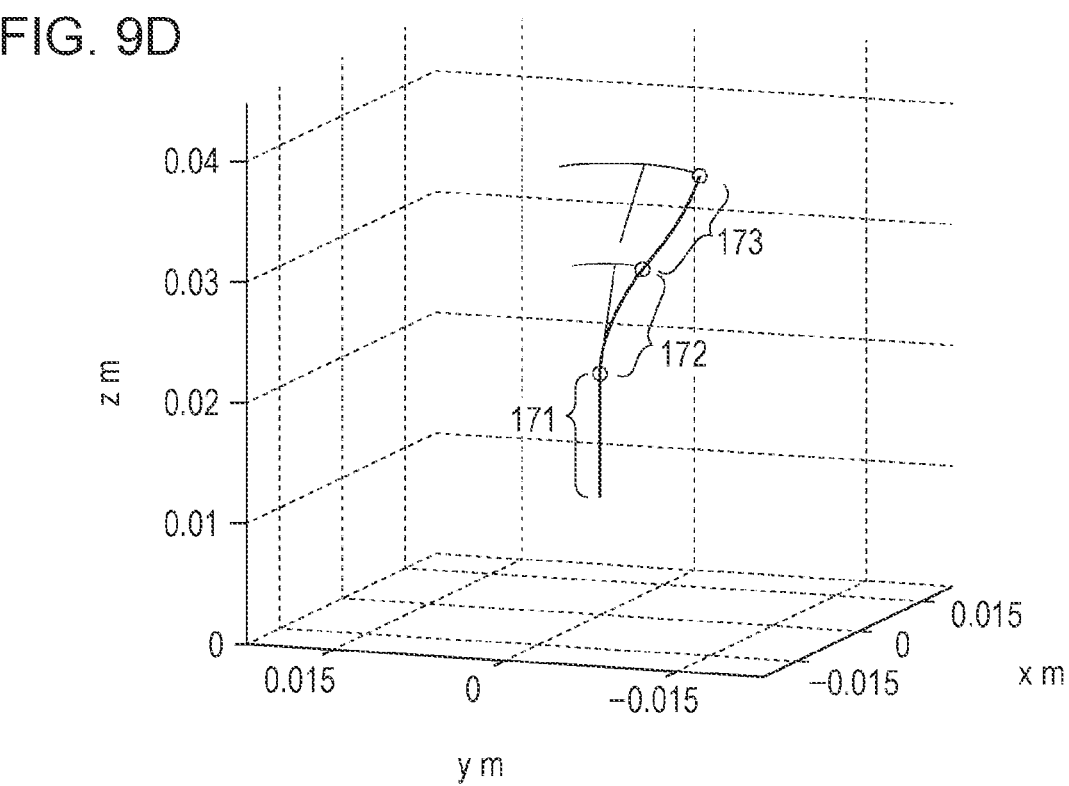
FIG. 9D is another diagram illustrating the second example of the result of simulation of the continuum robot control method by the continuum robot control system according to the first embodiment of the present disclosure.

FIG. 9C illustrates an operator's operation of the operating lever in the direction of deepening the rotational angle ζ of the second bending section 172. This causes the switch unit 330 to reverse the position of the double-pole double-throw switch illustrated in FIG. 4, so that the attitude illustrated in FIG. 9C is reached by adding an operation to the attitude set by the follow-the-leader control. FIG. 9D illustrates an attitude reached by an additional operation in the direction of shallowing the rotational angle ζ of the second bending section 172. This shows that it is possible to change the position of the distal-most end of the bendable portion 170 in an out-of-plane direction of the bending shape while keeping constant the direction of the leading end of the third bending section 173.

Figure 9E:
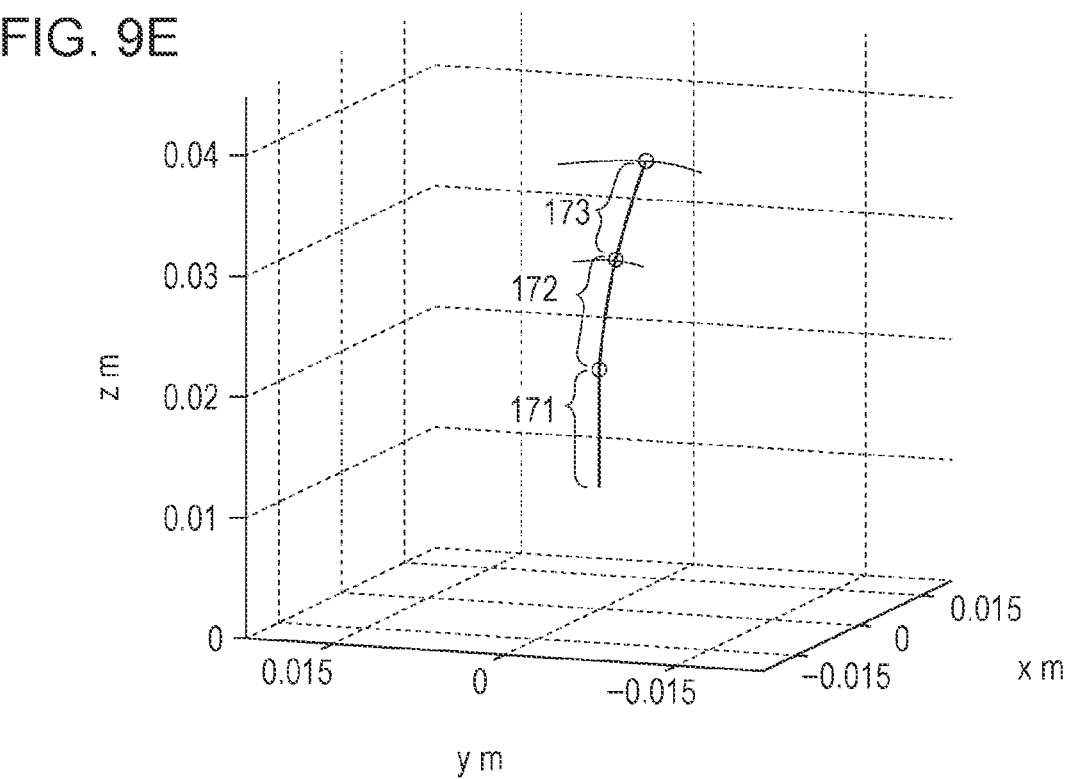
FIG. 9E is another diagram illustrating the second example of the result of simulation of the continuum robot control method by the continuum robot control system according to the first embodiment of the present disclosure.
Figure 9F:
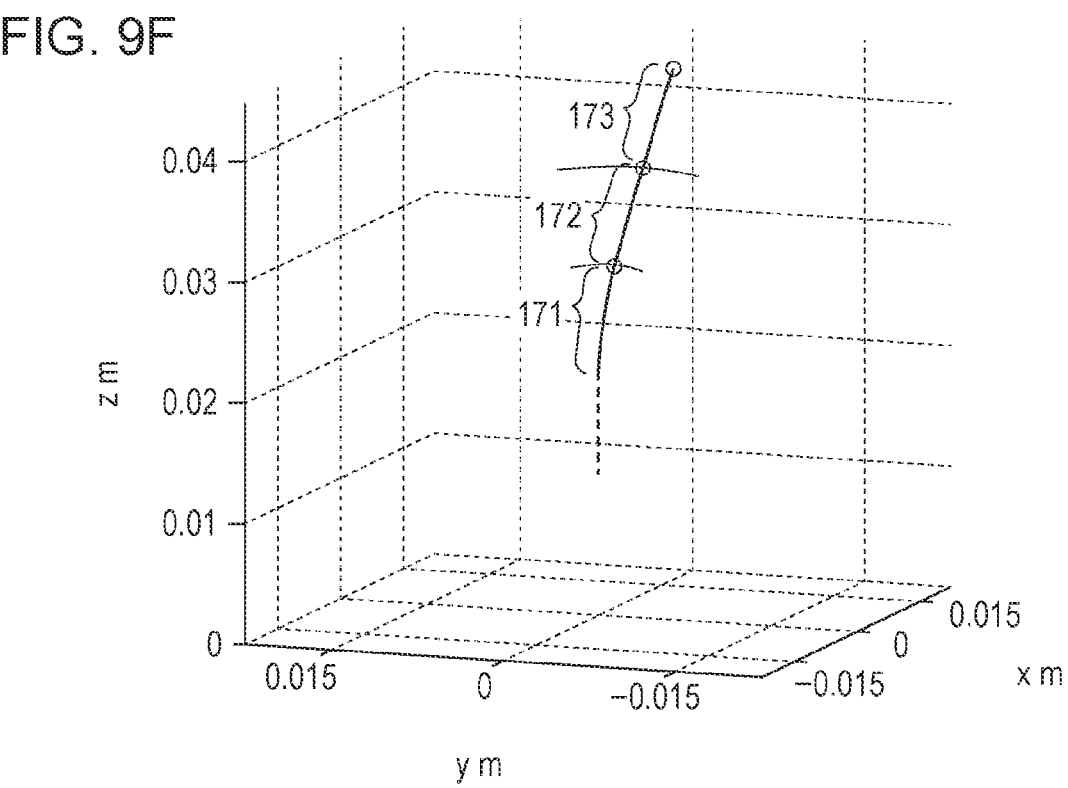
FIG. 9F is another diagram illustrating the second example of the result of simulation of the continuum robot control method by the continuum robot control system according to the first embodiment of the present disclosure.
Figure 10A:
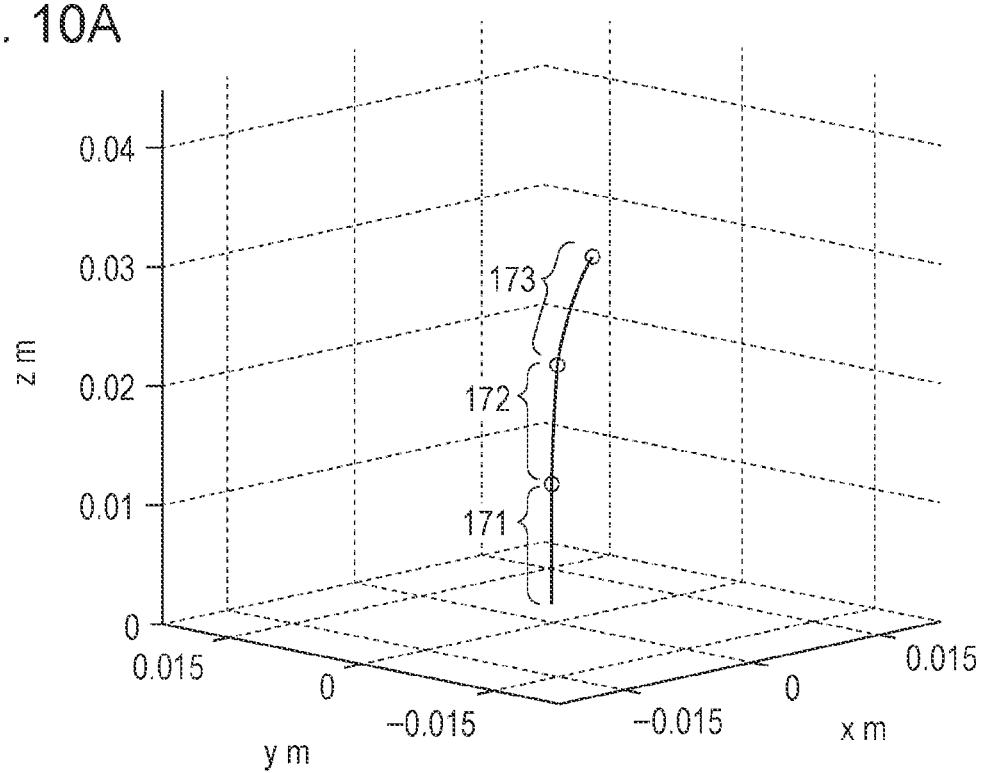
FIG. 10A is a diagram illustrating a third example of the result of simulation of the continuum robot control method by the continuum robot control system according to the first embodiment of the present disclosure.
Figure 10B:
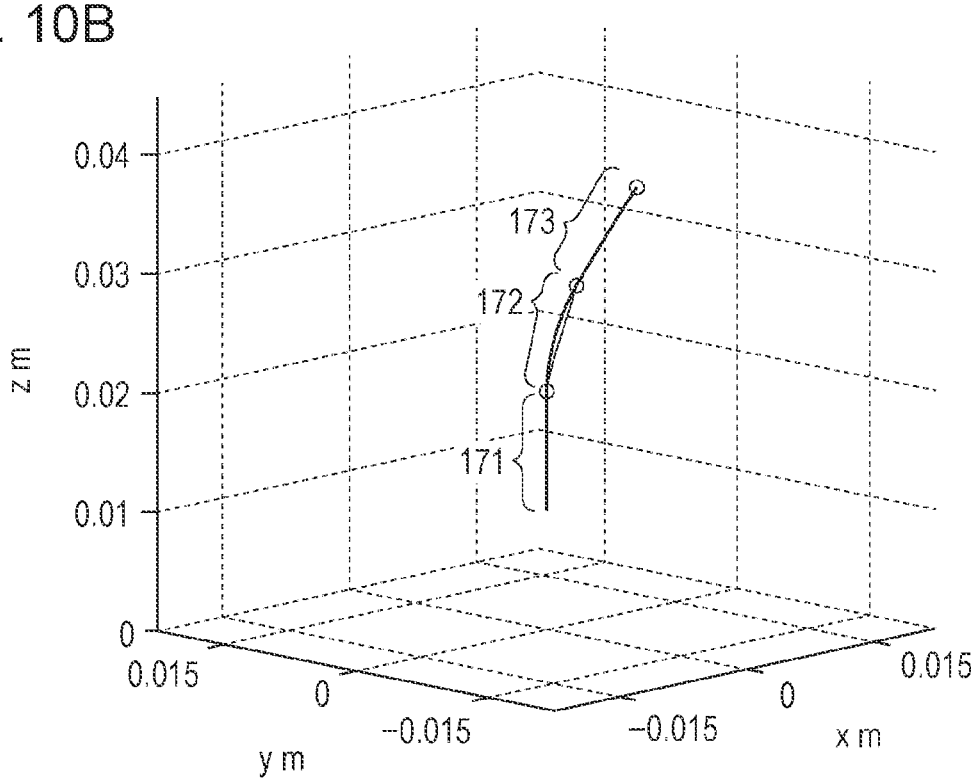
FIG. 10B is another diagram illustrating the third example of the result of simulation of the continuum robot control method by the continuum robot control system according to the first embodiment of the present disclosure.
Figure 10C:
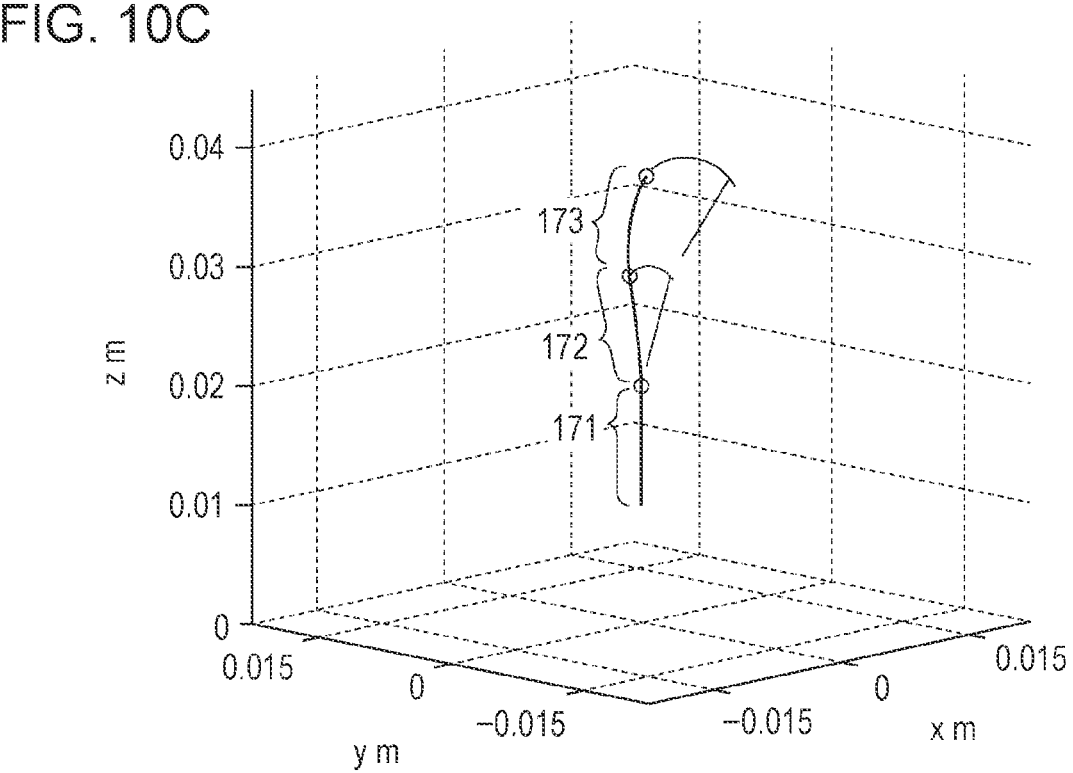
FIG. 10C is another diagram illustrating the third example of the result of simulation of the continuum robot control method by the continuum robot control system according to the first embodiment of the present disclosure.
Figure 10D:
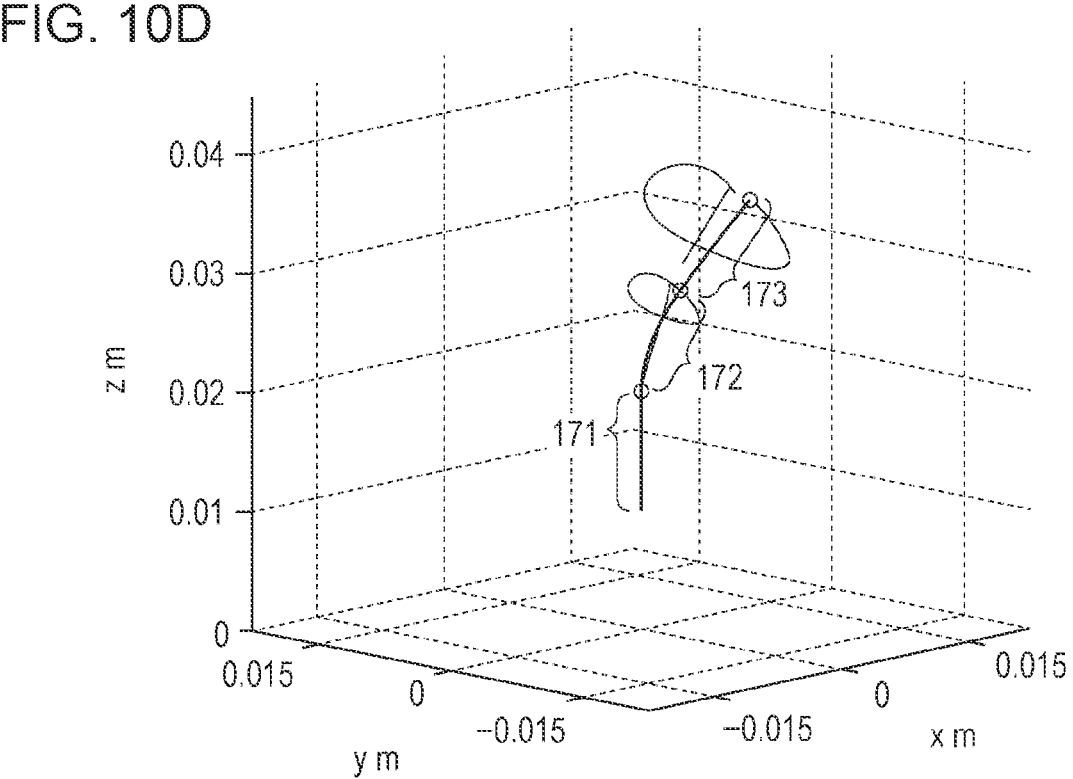
FIG. 10D is another diagram illustrating the third example of the result of simulation of the continuum robot control method by the continuum robot control system according to the first embodiment of the present disclosure.
Figure 10E:
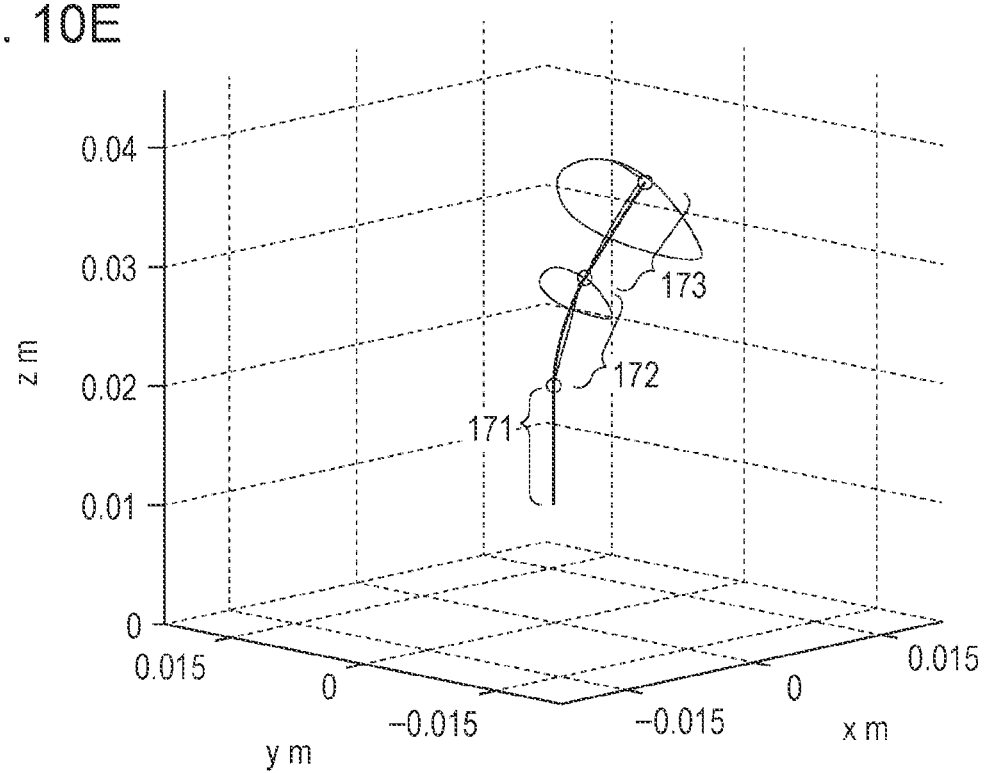
FIG. 10E is another diagram illustrating the third example of the result of simulation of the continuum robot control method by the continuum robot control system according to the first embodiment of the present disclosure.
Figure 10F:
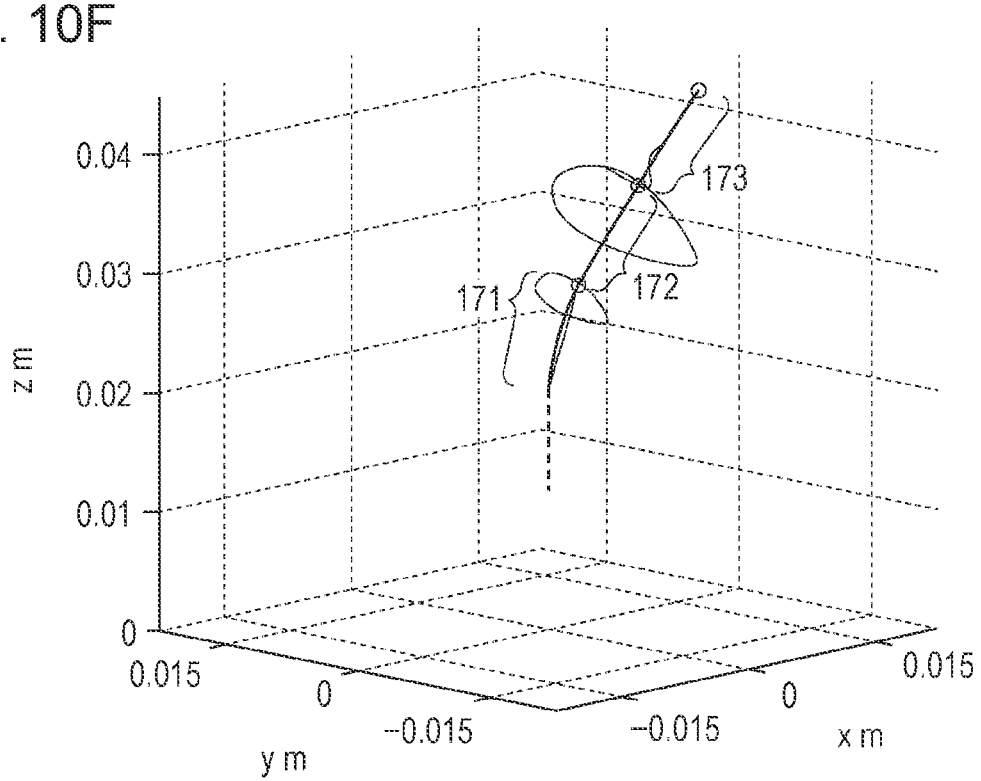
FIG. 10F is another diagram illustrating the third example of the result of simulation of the continuum robot control method by the continuum robot control system according to the first embodiment of the present disclosure.

FIG. 9E and FIG. 9F show that as the base 140 moves further, the follow-the-leader control can continue, which allows the second bending section 172 and the first bending section 171 to follow the third bending section 173 and the second bending section 172, respectively.

FIG. 10A to FIG. 10F are diagrams illustrating a third example of the result of simulation of the method of controlling the continuum robot 100 by the continuum robot control system 300-1 according to the first embodiment of the present disclosure. In FIG. 10A to FIG. 10F, the horizontal direction corresponds to the y direction in FIG. 1, the vertical direction corresponds to the z direction in FIG. 1, and the depth direction corresponds to the x direction in FIG. 1. FIG. 10A to FIG. 10F illustrate how the motion control of the bending sections 171 to 173 in the bendable portion 170 of the continuum robot 100 proceeds with time. Specifically, in FIG. 10A to FIG. 10F, the operation in FIG. 8A to FIG. 8F and the operation in FIG. 9A to FIG. 9F are combined, so as to control the position of the distal-most end of the bendable portion 170 while keeping constant the direction of the leading end of the third bending section 173 in a three-dimensional space.

In the continuum robot control system 300-1 according to the first embodiment, the block FTL calculates the target bending angle $\theta_{f\!FTL}$ and the target rotational angle $\zeta_{f\!FTL}$ of the following bending section on the basis of the target bending angle $\theta_{lt}$ and the target rotational angle $\zeta_{lt}$ of the distal-most bending section and the displacement of the base 140. The switch unit 330 performs a switching operation for selecting the target bending angle $\theta_{f\!FTL}$ and the target rotational angle $\zeta_{f\!FTL}$ of the following bending section obtained from the block FTL, or the target bending angle $\theta_{lf}$ and the target rotational angle $\zeta_{lf}$ of the following bending section obtained from the block $P_l$ corresponding to the following operating means. The kinematic computing unit 340 computes, on the basis of the target bending angle and the target rotational angle of the following bending section selected by the switch unit 330, the drive displacement by which the driving unit of the continuum robot 100 drives the wire in the following bending section.

This configuration enables switching between the motion control of the following bending section based on the follow-the-leader control and the motion control of the following bending section based on the operation by the following operating means, and thus can prevent the continuum robot 100 from accidentally coming into contact with an object. Therefore, it is possible to prevent the object or the continuum robot 100 from being damaged, and ensure safe operation of the continuum robot 100. Specifically, in the present embodiment, follow-the-leader control can seamlessly transition to observation motion control, an oblique motion can be performed by an additional operation, and the follow-the-leader control can be performed again after completion of the additional operation.

Second Embodiment

A second embodiment of the present disclosure will now be described. In the description of the second embodiment, things in common with the first embodiment will be omitted, and things different from the first embodiment will be described.

A general configuration of a continuum robot according to the second embodiment is the same as the general configuration of the continuum robot 100 according to the first embodiment illustrated in FIG. 1 and FIG. 2. A general configuration of an operating device according to the second embodiment is the same as the general configuration of the operating device 200-1 according to the first embodiment illustrated in FIG. 3.

The control system described in the first embodiment simply gives an operator's operation command to the distal-most bending section. In the second embodiment, however, the distal-most bending section is operated in conjunction with an additional operation of the following bending section to provide more types of observation motions. For example, when the bendable portion 170 of the continuum robot 100 includes three bending sections as in the case of FIG. 1, the position of the leading end of the bendable portion 170 of the continuum robot 100 can be significantly changed by driving the second bending section 172 and the third bending section 173 in the same direction. This motion is suitable for significantly moving the distal-most end of the continuum robot 100, for example, to observe across a wide area inside the body, or to avoid contact with organs (hereinafter referred to as "large bending motion").

Figure 11:
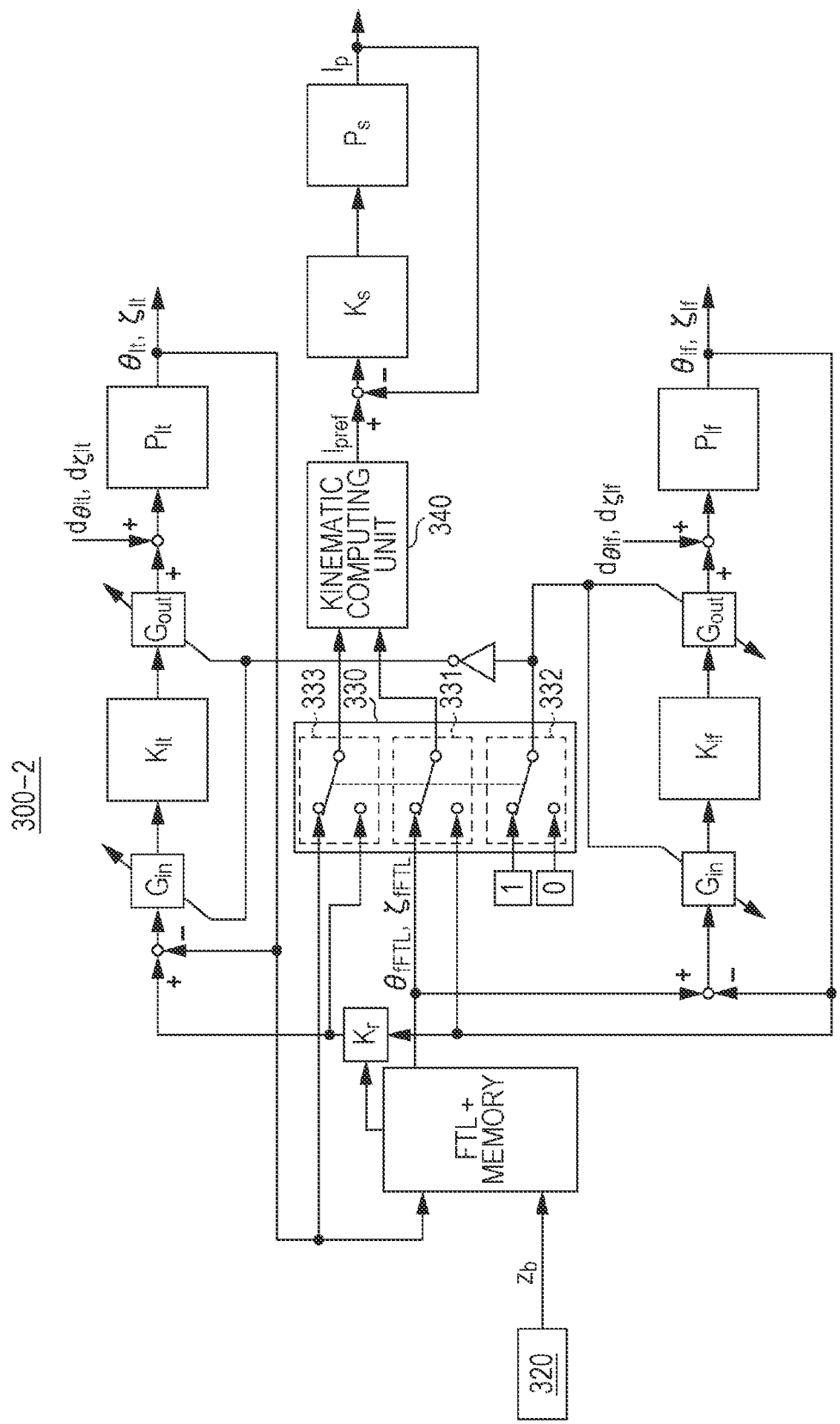
FIG. 11 is a diagram illustrating an example of a general configuration of a continuum robot control system according to a second embodiment of the present disclosure.

FIG. 11 is a diagram illustrating an example of a general configuration of the continuum robot control system 300 according to the second embodiment of the present disclosure. In the following description, the continuum robot control system 300 according to the second embodiment illustrated in FIG. 11 is referred to as a "continuum robot control system 300-2". In FIG. 11, the same elements as those in FIG. 4 are denoted by the same reference numerals and their detailed description will be omitted. Specifically, FIG. 11 is a block diagram illustrating a control system that operates the distal-most bending section in conjunction with addition of an operation to the following bending section.

The continuum robot control system 300-2 according to the second embodiment, illustrated in FIG. 11, is obtained by adding some components (described below) to, and changing some components (described below) of, the continuum robot control system 300-1 according to the first embodiment illustrated in FIG. 4.

Unlike the continuum robot control system 300-1 illustrated in FIG. 4, the continuum robot control system 300-2 includes a block Kit, blocks $G_{in}$ and $G_{out}$ connected to an input end and an output end, respectively, of the block $K_{lt}$, a block $P_{lt}$, and a block $K_r$. The continuum robot control system 300-2 does not include the input device 310 of the continuum robot control system 300-1 illustrated in FIG. 4. The block FTL, the block $K_l$, and the block $P_l$ of the continuum robot control system 300-1 illustrated in FIG. 4 are changed to a block FTL+Memory (storage unit), a block $K_{lf}$, and a block $P_{lf}$, respectively, in the continuum robot control system 300-2. The switch unit 330 of the continuum robot control system 300-2 includes a third switch 333, as well as the first switch 331 and the second switch 332 of the continuum robot control system 300-1 illustrated in FIG. 4. Unlike the continuum robot control system 300-1 illustrated in FIG. 4, the continuum robot control system 300-2 includes a NOT gate downstream of the second switch 332.

The block $P_{lt}$ in FIG. 11 is an operating system including a motor for the distal-most bending section (distal-most operating means), the block $P_{lf}$ in FIG. 11 is an operating system including a motor for the following bending section (following operating means). Also, the block $K_{lt}$ in FIG. 11 is an operating-system position control system for the distal-most bending section, and the block $K_{lf}$ in FIG. 11 is an operating-system position control system for the following bending section. Also, the target bending angle $\theta_{lt}$ of the distal-most bending section in FIG. 11 is the angle of the operating lever for the bending angle of the distal-most section, and the target rotational angle $\zeta_{lt}$ of the distal-most bending section in FIG. 11 is the angle of the operating lever for the rotational angle of the distal-most section. The target bending angle $\theta_{lt}$ and the target rotational angle $\zeta_{lt}$ correspond to $\theta_{ln}$ and $\zeta_{ln}$, respectively, in Equation (4). Operating torques $d_{\theta_{lt}}$ and $d_{\zeta_{lt}}$ are operating torques the operator applies to the operating levers for the bending angle and the rotational angle, respectively, of the distal-most bending section, and correspond to $d_{\theta_n}$ and $d_{\zeta_n}$, respectively, in Equation (4). The block FTL+Memory (storage unit) includes a storage unit that stores the target bending angle $\theta_{lt}$ and the target rotational angle $\zeta_{lt}$ of the distal-most bending section, as well as the target bending angle $\theta_{lFTL}$ and the target rotational angle $\zeta_{lFTL}$ of the following bending section for the follow-the-leader control of the first embodiment.

The block $K_r$ is an algorithm that makes the attitudes of the following bending section the distal-most bending section in conjunction with each other. Switching the block $K_r$ can change the type of motion. Specifically, the block $K_r$ is distal-most calculating means that calculates the target bending angle and the target rotational angle of the distal-most bending section on the basis of the target bending angle $\theta_{lt}$ and the target rotational angle $\zeta_{lt}$ of the distal-most bending section stored in the block FTL+Memory (storage unit), and also on the basis of the target bending angle $\theta_{lf}$ and the target rotational angle $\zeta_{lf}$ of the following bending section received from the block $P_{lf}$ corresponding to the following operating means.

The third switch 333 of the switch unit 330 is a switch (distal-most switching means) that performs a switching operation for selecting the target bending angle and the target rotational angle of the distal-most bending section obtained from the block $K_r$, or the target bending angle $\theta_{lt}$ and the target rotational angle $\zeta_{lt}$ of the distal-most bending section obtained from the block $P_{lt}$ (distal-most operating means).

In the present embodiment, the kinematic computing unit 340 computes, on the basis of the target bending angle and the target rotational angle of the distal-most bending section selected by the third switch 333, the drive displacement by which the driving unit of the continuum robot 100 drives the wire in the distal-most bending section.

In the present embodiment, during follow-the-leader control (specifically, while the "1" signal is being received by the second switch 332), the switch unit 330 is in the state of a triple-pole double-throw switch illustrated in FIG. 11. In this case, the NOT gate downstream of the second switch 332 provides a value of 0 to the blocks $G_{in}$ and $G_{out}$ in a feedback loop of the operating system for the distal-most bending section, illustrated in the upper part of FIG. 11. This shuts off the operating system for the distal-most bending section and allows the operating torques $d_{\theta_{lt}}$ and $d_{\zeta_{lt}}$ to change the angles $\theta_{lt}$ and $\zeta_{lt}$ of the operating levers. That is, during the follow-the-leader control described above, the third switch 333 performs a switching operation for selecting the target bending angle $\theta_{lt}$ and the target rotational angle $\zeta_{lt}$ of the distal-most bending section obtained from the block $P_{lt}$. In this case, the kinematic computing unit 340 receives the target bending angle $\theta_{lt}$ and the target rotational angle $\zeta_{lt}$ of the distal-most bending section, obtained from the block $P_{lt}$, and the target bending angle $\theta_{lFTL}$ and the target rotational angle $\zeta_{lFTL}$ of the following bending section, obtained from the block FTL+Memory.

At this point, when operator's contact with the operating lever for the following bending section is detected (specifically, when the second switch 332 receives the "0" signal), the switch unit 330 reverses the position of the triple-pole double-throw switch illustrated in FIG. 11. In this case, the blocks $G_{in}$ and $G_{out}$ in a feedback loop of the operating system for the following bending section, illustrated in the lower part of FIG. 11, receive a value of 0. This shuts off the operating system for the following bending section and allows the operating torques $d_{\theta_{lf}}$ and $d_{\zeta_{lf}}$ to change the angles $\theta_{lf}$ and $\zeta_{lf}$ of the operating levers. At the same time, the kinematic computing unit 340 receives the target bending angle $\theta_{lf}$ and the target rotational angle $\zeta_{lf}$ of the following bending section through the first switch 331. This allows seamless transition from the follow-the-leader control to addition of an operator's operation onto the attitude of the continuum robot 100. On the other hand, the NOT gate downstream of the second switch 332 provides a value of 1 to the blocks $G_{in}$ and $G_{out}$ in the feedback loop of the operating system for the distal-most bending section, illustrated in in the upper part of FIG. 11. This enables positioning control by the block Kit and suppresses the operating torques $d_{\theta_{lt}}$ and $d_{\zeta_{lt}}$ from the operator as disturbance. In this case, the third switch 333 performs a switching operation for selecting the target bending angle and the target rotational angle of the distal-most bending section obtained from the block $K_r$. This allows the continuum robot 100 and the operating levers to operate in conjunction with the amount of additional operation and allows angles related to the distal-most bending section to change in conjunction with the amount of additional operation on the following bending section.

FIG. 12A to FIG. 12F are diagrams illustrating a first example of a result of simulation of a method of controlling the continuum robot 100 by the continuum robot control system 300-2 according to the second embodiment of the present disclosure. In FIG. 12A to FIG. 12F, the horizontal direction corresponds to the x direction in FIG. 1, and the vertical direction corresponds to the z direction in FIG. 1. FIG. 12A to FIG. 12F illustrate how the motion control of the bending sections 171 to 173 in the bendable portion 170 of the continuum robot 100 proceeds with time. Specifically, FIG. 12A to FIG. 12F illustrate a simulation response of giving an additional operation. In FIG. 12A to FIG. 12F, a solid line represents the shape of the bendable portion 170 of the continuum robot 100, an open circle represents the leading end of each bending section, and a thin line represents the locus of the leading end of each bending section.

Figure 12A:
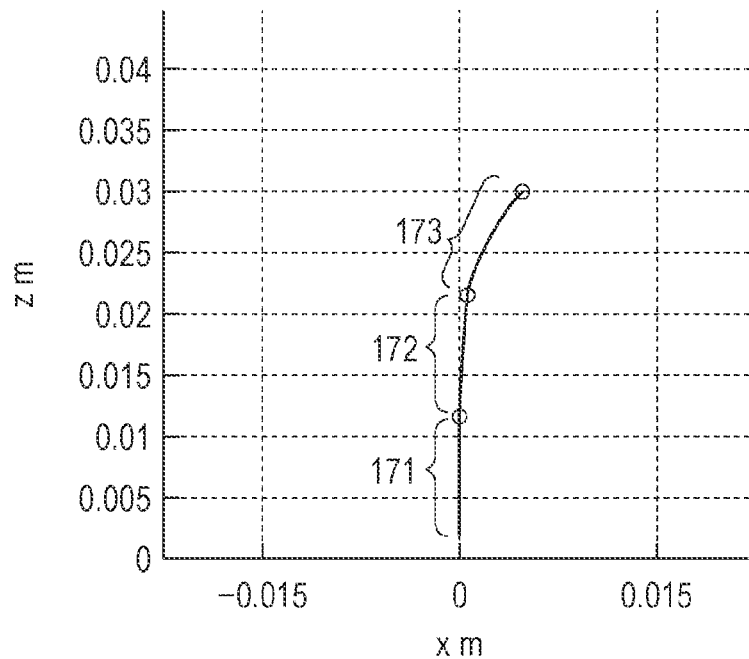
FIG. 12A is a diagram illustrating a first example of a result of simulation of a continuum robot control method by the continuum robot control system according to the second embodiment of the present disclosure.
Figure 12B:
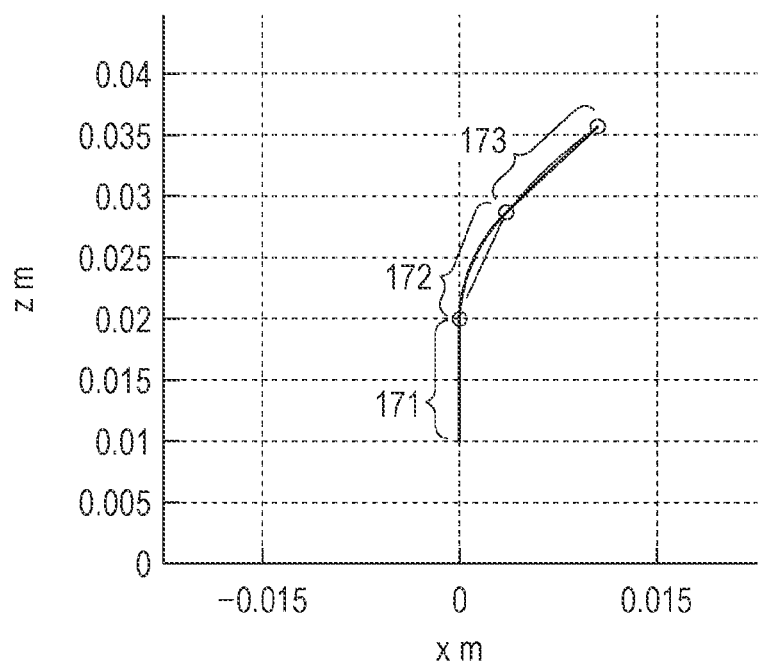
FIG. 12B is another diagram illustrating the first example of the result of simulation of the continuum robot control method by the continuum robot control system according to the second embodiment of the present disclosure.

In FIG. 12A and FIG. 12B, the same follow-the-leader control as that illustrated in FIG. 9A and FIG. 9B is performed.

Figure 12C:
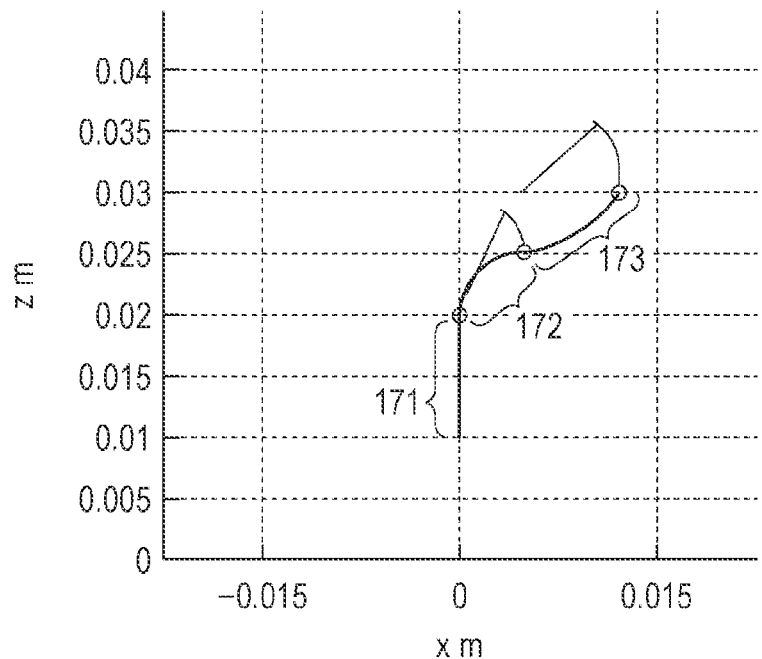
FIG. 12C is another diagram illustrating the first example of the result of simulation of the continuum robot control method by the continuum robot control system according to the second embodiment of the present disclosure.

FIG. 12C illustrates motion control based on an operator's operation of the operating lever at the bending angle $\theta$ of the second bending section 172. This causes the switch unit 330 to reverse the position of the triple-pole double-throw switch illustrated in FIG. 11, so that the attitude illustrated in FIG. 12C is reached by adding an operation to the attitude set by the follow-the-leader control. In this simulation, a bending angle $\theta_{3ref}$ of the distal-most bending section is changed in conjunction with the difference between the command angle of the follow-the-leader control on the second bending section 172 and the angle of the additional operation ($\theta_{l2} - \theta_{2FTL}$) in such a way as to satisfy Equation (8) below:

$$\theta_{3ref} = \theta_{3Mem} - 0.5(\theta_{l2} - \theta_{2FTL}) \tag{8}$$

where $\theta_{3Mem}$ is the bending angle of the distal-most bending section immediately before switching of the triple-pole double-throw switch of the switch unit 330, stored in the block FTL+Memory (storage unit).

Figure 12D:
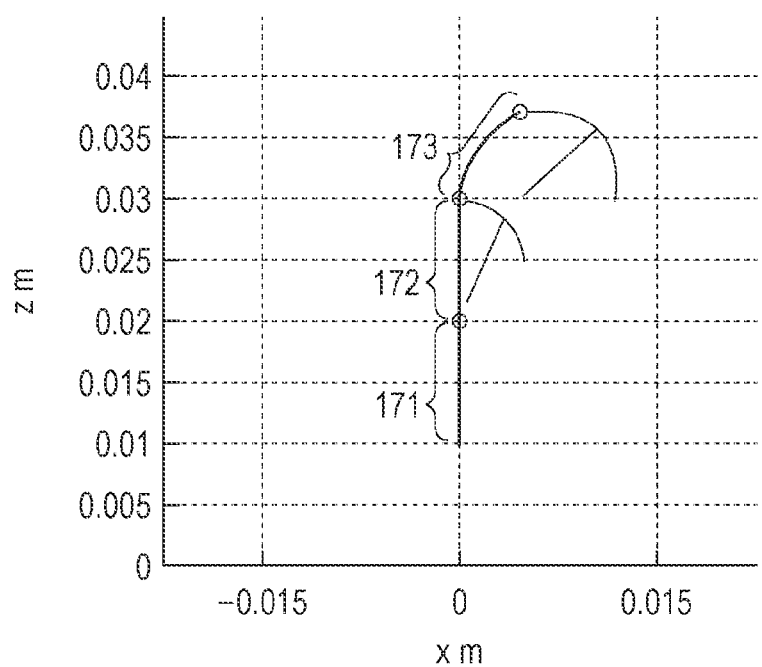
FIG. 12D is another diagram illustrating the first example of the result of simulation of the continuum robot control method by the continuum robot control system according to the second embodiment of the present disclosure.

FIG. 12D illustrates an attitude reached by an additional operation in the direction of shallowing the bending angle $\theta$ of the second bending section 172. This shows that the direction of observation is changed by an additional operation while the third bending section 173 is always directed toward a small region around [x, y]=[0.015, 0.4] in front.

Figure 12E:
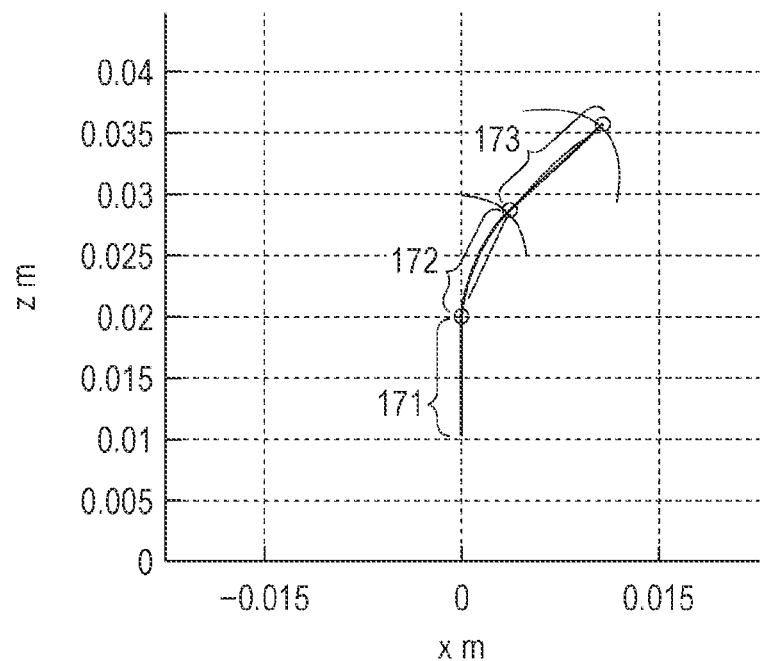
FIG. 12E is another diagram illustrating the first example of the result of simulation of the continuum robot control method by the continuum robot control system according to the second embodiment of the present disclosure.
Figure 12F:
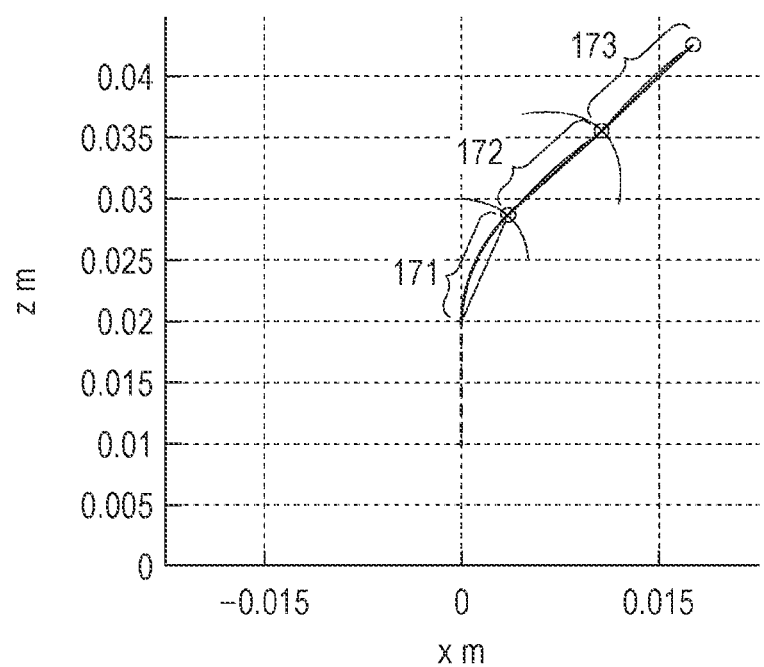
FIG. 12F is another diagram illustrating the first example of the result of simulation of the continuum robot control method by the continuum robot control system according to the second embodiment of the present disclosure.

FIG. 12E and FIG. 12F show that as the base 140 moves further, the follow-the-leader control can continue, which allows the second bending section 172 and the first bending section 171 to follow the third bending section 173 and the second bending section 172, respectively.

FIG. 13A to FIG. 13F are diagrams illustrating a second example of the result of simulation of the method of controlling the continuum robot 100 by the continuum robot control system 300-2 according to the second embodiment of the present disclosure. In FIG. 13A to FIG. 13F, the horizontal direction corresponds to the x direction in FIG. 1, and the vertical direction corresponds to the z direction in FIG. 1. FIG. 13A to FIG. 13F illustrate how the motion control of the bending sections 171 to 173 in the bendable portion 170 of the continuum robot 100 proceeds with time. Specifically, FIG. 13A to FIG. 13F illustrate a large bending motion provided by an additional operation.

In the simulation illustrated in FIG. 13A to FIG. 13F, the bending angle $\theta_{3ref}$ of the distal-most end is changed in conjunction with the difference between the command angle of the follow-the-leader control on the second bending section 172 and the angle of the additional operation in such a way as to satisfy Equation (9) below:

$$\theta_{3ref} = \theta_{3Mem} + 3(\theta_{l2} - \theta_{2FTL}) \tag{9}$$

Figure 13A:
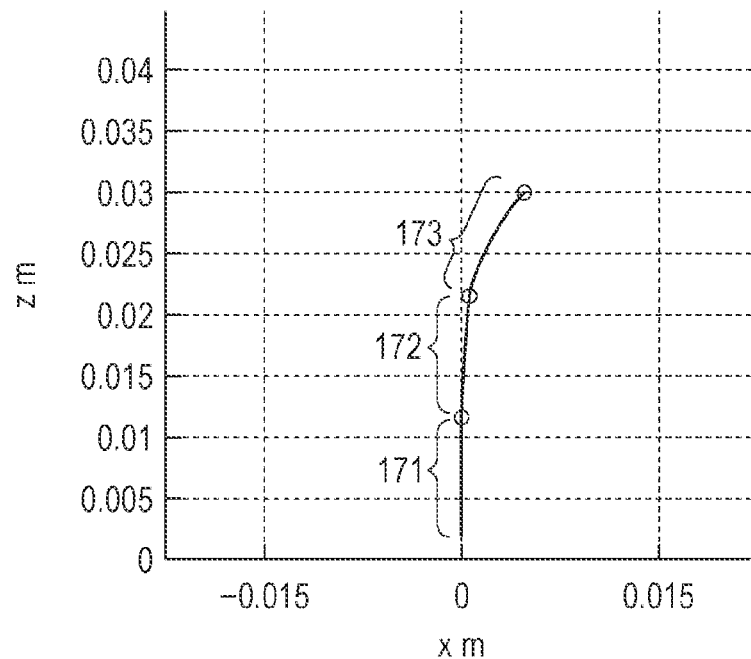
FIG. 13A is a diagram illustrating a second example of the result of simulation of the continuum robot control method by the continuum robot control system according to the second embodiment of the present disclosure.
Figure 13B:
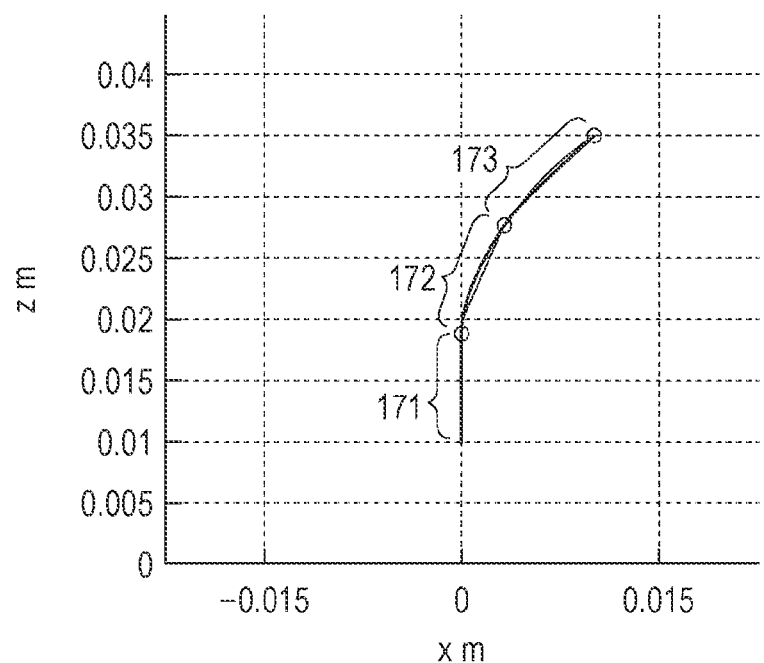
FIG. 13B is another diagram illustrating the second example of the result of simulation of the continuum robot control method by the continuum robot control system according to the second embodiment of the present disclosure.
Figure 13C:
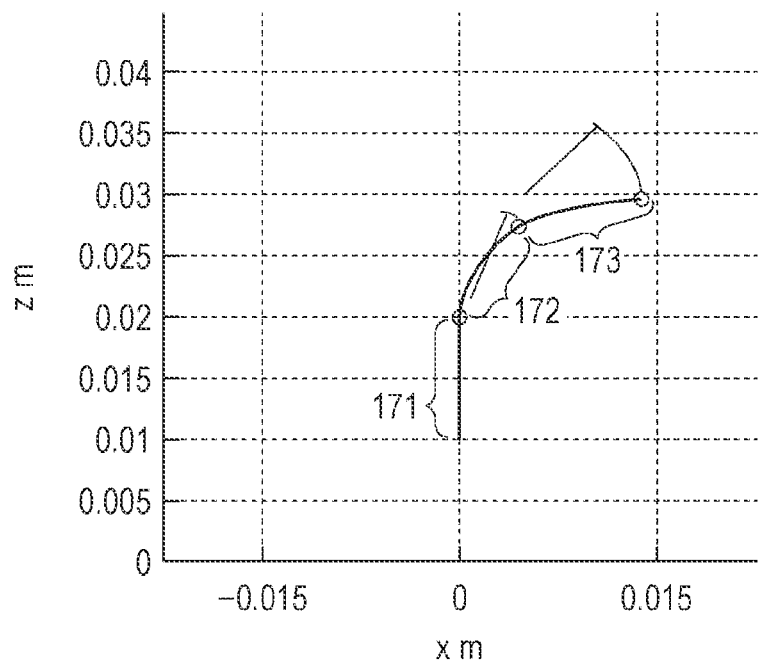
FIG. 13C is another diagram illustrating the second example of the result of simulation of the continuum robot control method by the continuum robot control system according to the second embodiment of the present disclosure.
Figure 13D:
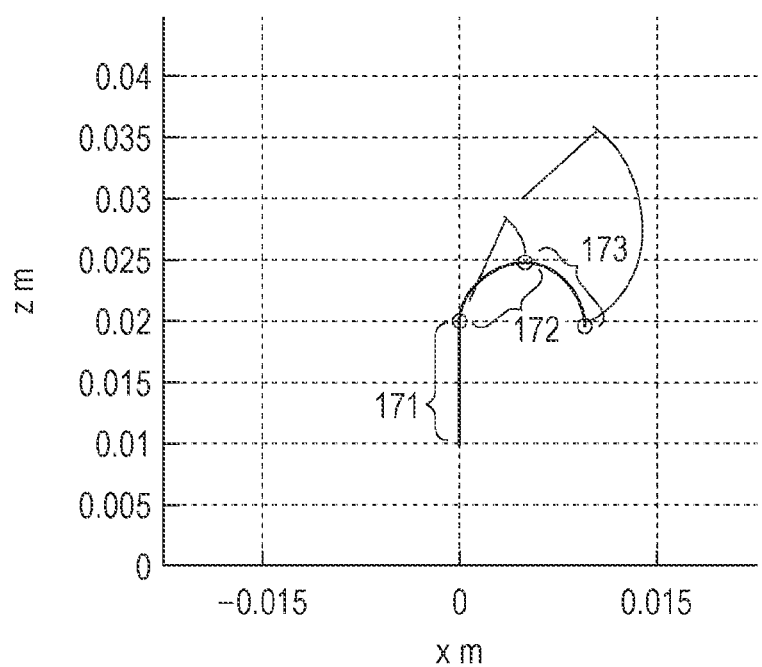
FIG. 13D is another diagram illustrating the second example of the result of simulation of the continuum robot control method by the continuum robot control system according to the second embodiment of the present disclosure.
Figure 13E:
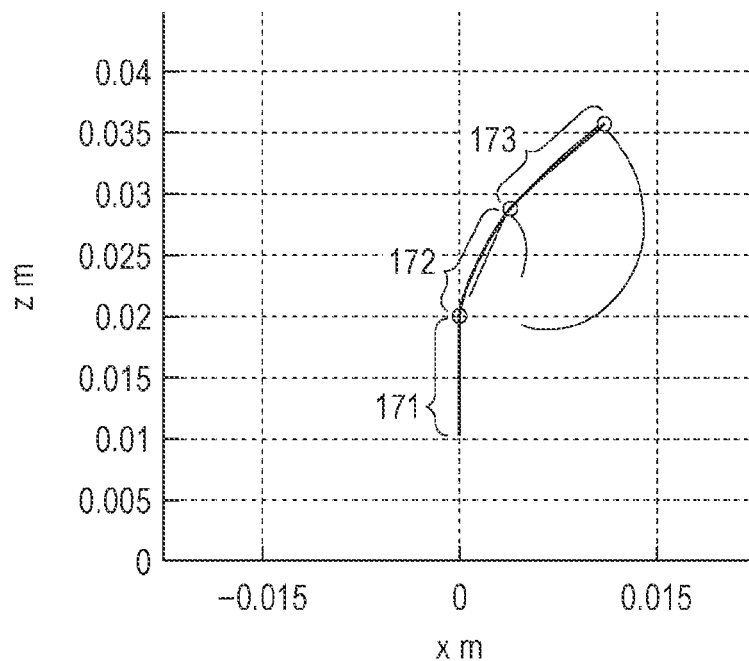
FIG. 13E is another diagram illustrating the second example of the result of simulation of the continuum robot control method by the continuum robot control system according to the second embodiment of the present disclosure.
Figure 13F:
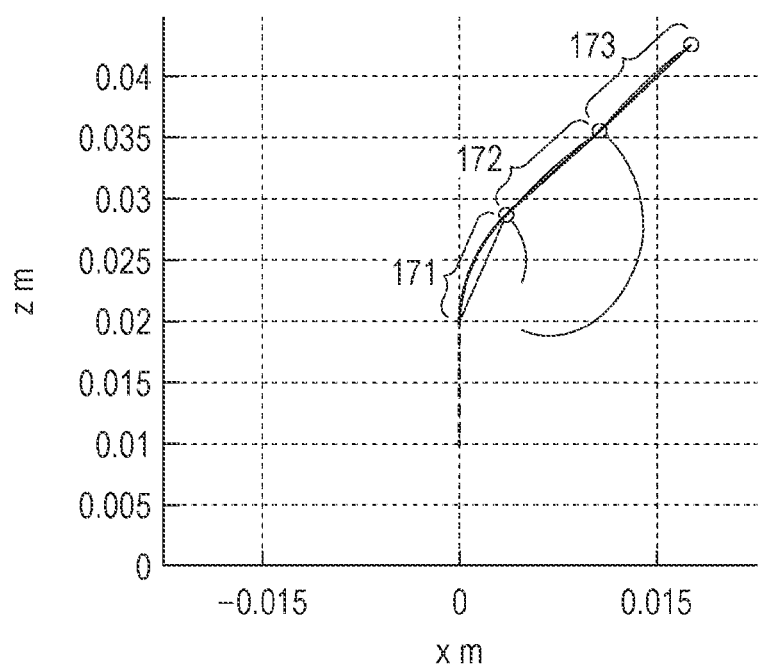
FIG. 13F is another diagram illustrating the second example of the result of simulation of the continuum robot control method by the continuum robot control system according to the second embodiment of the present disclosure.

The second bending section 172 and the third bending section 173 are thus moved in conjunction with each other to provide a large bending motion. FIG. 13E and FIG. 13F show that as the base 140 moves further, the follow-the-leader control can continue, which allows the second bending section 172 and the first bending section 171 to follow the third bending section 173 and the second bending section 172, respectively.

The simulations illustrated in FIG. 12A to FIGS. 12F and 13A to FIG. 13F have been described by taking the bending angle $\theta$ into account, because the motion control of the bendable portion 170 is assumed to take place in the xz plane. If the motion control takes place in the xyz three-dimensional space, the rotational angle $\zeta$ may also be taken into account.

Like the first embodiment, the second embodiment can prevent the continuum robot 100 from accidentally coming into contact with an object. Therefore, it is possible to prevent the object or the continuum robot 100 from being damaged, and ensure safe operation of the continuum robot 100.

Third Embodiment

A third embodiment of the present disclosure will now be described. In the description of the third embodiment, things in common with the first and second embodiments will be omitted, and things different from the first and second embodiments will be described.

A general configuration of a continuum robot according to the third embodiment is the same as the general configuration of the continuum robot 100 according to the first embodiment illustrated in FIG. 1 and FIG. 2. A general configuration of an operating device according to the third embodiment is the same as the general configuration of the operating device 200-1 according to the first embodiment illustrated in FIG. 3.

The control system of the second embodiment operates the distal-most bending section in conjunction with an additional operation of the following bending section. In the third embodiment, however, the following bending sections are operated in conjunction with each other to provide more types of observation motions.

Figure 14:
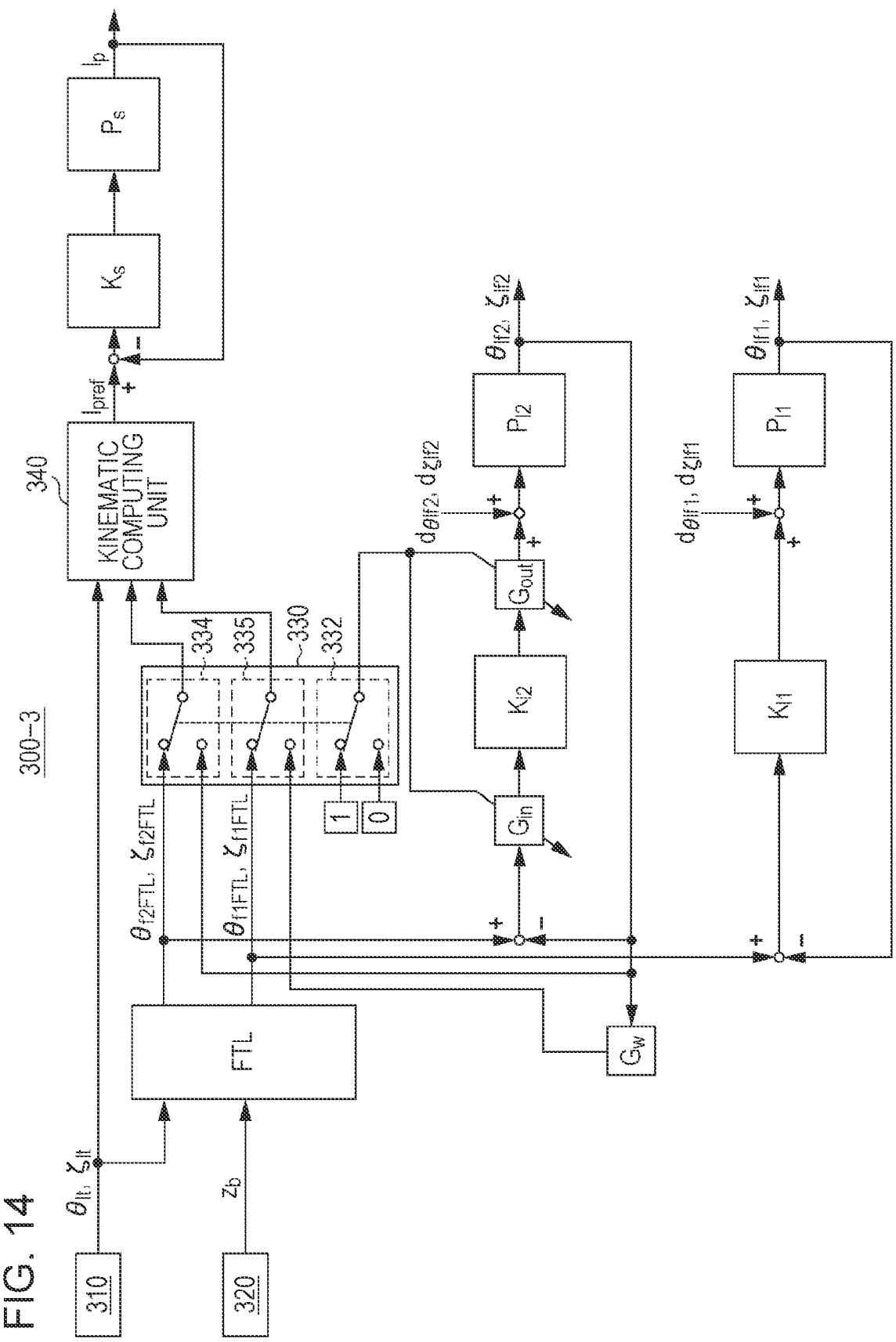
FIG. 14 is a diagram illustrating an example of a general configuration of a continuum robot control system according to a third embodiment of the present disclosure.

FIG. 14 is a diagram illustrating an example of a general configuration of the continuum robot control system 300 according to the third embodiment of the present disclosure. In the following description, the continuum robot control system 300 according to the third embodiment illustrated in FIG. 14 is referred to as a "continuum robot control system 300-3". In FIG. 14, the same elements as those in FIG. 4 are denoted by the same reference numerals and their detailed description will be omitted.

Specifically, FIG. 14 is a block diagram illustrating a control system that allows the following bending sections to be operated in conjunction with each other by an additional operation.

The continuum robot control system 300-3 according to the third embodiment, illustrated in FIG. 14, is obtained by adding some components (described below) to, and changing some components (described below) of, the continuum robot control system 300-1 according to the first embodiment illustrated in FIG. 4.

Unlike the continuum robot control system 300-1 illustrated in FIG. 4, the continuum robot control system 300-3 includes two control systems for following bending sections. Specifically, the control system for the following bending section including the block $K_l$, the blocks $G_{in}$ and $G_{out}$ connected to the input end and the output end of the block $K_l$, and the block $P_l$, illustrated in FIG. 4, is changed to a control system for the second bending section 172 (second following bending section) in the continuum robot control system 300-3. More specifically, the control system for the second bending section 172 is a control system for the following bending section including a block $K_{l2}$, the blocks $G_{in}$ and $G_{out}$ connected to the input end and the output end of the block $K_{l2}$, and a block $P_{l2}$ illustrated in FIG. 14. Unlike the continuum robot control system 300-1 illustrated in FIG. 4, the continuum robot control system 300-3 further includes a control system for the first bending section 171 (first following bending section). More specifically, the control system for the first bending section 171 is a control system for the following bending section including a block $K_{l1}$ and a block $P_{l1}$ illustrated in FIG. 14. Unlike the continuum robot control system 300-1 illustrated in FIG. 4, the continuum robot control system 300-3 further includes a control gain block $G_w$. Also, the switch unit 330 of the continuum robot control system 300-3 includes a fourth switch 334 and a fifth switch 335, instead of the first switch 331 of the continuum robot control system 300-1 illustrated in FIG. 4.

The block $P_{l1}$ is an operating system (first following operating means), including a motor, for receiving a target bending angle $\theta_{l/1}$ and a target rotational angle $\zeta_{l/1}$ of the first bending section 171 (first following bending section). In the example illustrated in FIG. 3, for example, the block $P_{l1}$ is an operating system corresponding to the first operating unit 210 for operating the first bending section 171 (following bending section). Specifically, the target bending angle $\theta_{l/1}$ and the target rotational angle $\zeta_{l/1}$ of the first bending section 171 are angles of the operating levers for the first bending section 171. Operating torques $d_{\theta_{l/1}}$ and $d_{\zeta_{l/1}}$ are operating torques the operator applies to the operating lever at the bending angle of the first bending section 171 and to the operating lever at the rotational angle of the first bending section 171.

The block $P_{l2}$ is an operating system (second following operating means), including a motor, for receiving a target bending angle $\theta_{l/2}$ and a target rotational angle $\zeta_{l/2}$ of the second bending section 172 (second following bending section). In the example illustrated in FIG. 3, for example, the block $P_{l2}$ is an operating system corresponding to the second operating unit 220 for operating the second bending section 172 (following bending section). Specifically, the target bending angle $\theta_{l/2}$ and the target rotational angle $\zeta_{l/2}$ of the second bending section 172 are angles of the operating levers for the second bending section 172. Operating torques $d_{\theta_{l/2}}$ and $d_{\zeta_{l/2}}$ are operating torques the operator applies to the operating lever at the bending angle of the second bending section 172 and to the operating lever at the rotational angle of the second bending section 172.

The block $K_{l1}$ is an operating-system position control system for the first bending section 171 (first following bending section), and the block $K_{l2}$ is an operating-system position control system for the second bending section 172 (second following bending section).

In the present embodiment, the block FTL calculates a target bending angle $\theta_{l2FTL}$ and a target rotational angle $\zeta_{l2FTL}$ of the second bending section 172, and also calculates a target bending angle $\theta_{l1FTL}$ and a target rotational angle $\zeta_{l1FTL}$ of the first bending section 171.

In the continuum robot control system 300-3 illustrated in FIG. 14, the control gain block $G_w$ is a matrix that specifies the ratio of the attitudes of the following bending section and the distal-most bending section, and switching the control gain block $G_w$ can change the type of motion. Specifically, in the example illustrated in FIG. 14, the control gain block $G_w$ is control gain means that multiplies, by a control gain, the target bending angle $\theta_{l/2}$ and the target rotational angle $\zeta_{l/2}$ of the second bending section 172 obtained from the block $P_{l2}$ (second following operating means).

In the present embodiment, for example, when operator's contact with the operating lever for the second bending section 172 is detected (specifically, when the second switch 332 receives the "0" signal), the switch unit 330 reverses the position of the triple-pole double-throw switch illustrated in FIG. 14. The switch unit 330 thus causes the fourth switch 334 to perform a switching operation for selecting, as the target bending angle and the target rotational angle of the second bending section 172, the target bending angle $\theta_{l/2}$ and the target rotational angle $\zeta_{l/2}$ of the second bending section 172 obtained from the block $P_{l2}$ (second following operating means), and also causes the fifth switch 335 to perform a switching operation for selecting, as the target bending angle and the target rotational angle of the first bending section 171, the target bending angle $\theta_{l/2}$ and the target rotational angle $\zeta_{l/2}$ of the second bending section 172 multiplied by the control gain by the control gain block $G_w$.

FIG. 15A to FIG. 15F are diagrams illustrating an example of the result of simulation of the method of controlling the continuum robot 100 by the continuum robot control system 300-3 according to the third embodiment of the present disclosure. In FIG. 15A to FIG. 15F, the horizontal direction corresponds to the x direction in FIG. 1, and the vertical direction corresponds to the z direction in FIG. 1. FIG. 15A to FIG. 15F illustrate how the motion control of the bending sections 171 to 173 in the bendable portion 170 of the continuum robot 100 proceeds with time. Specifically, FIG. 15A to FIG. 15F illustrate a simulation response of giving an additional operation. In FIG. 15A to FIG. 15F, a solid line represents the shape of the bendable portion 170 of the continuum robot 100, an open circle represents the leading end of each bending section, and a thin line represents the locus of the leading end of each bending section.

Figure 15A:
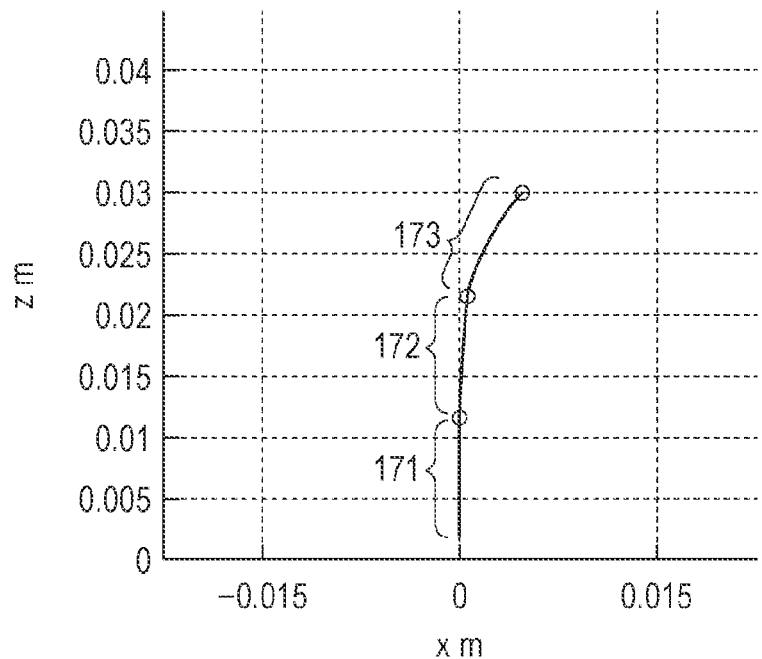
FIG. 15A is a diagram illustrating an example of a result of simulation of a continuum robot control method by the continuum robot control system according to the third embodiment of the present disclosure.
Figure 15B:
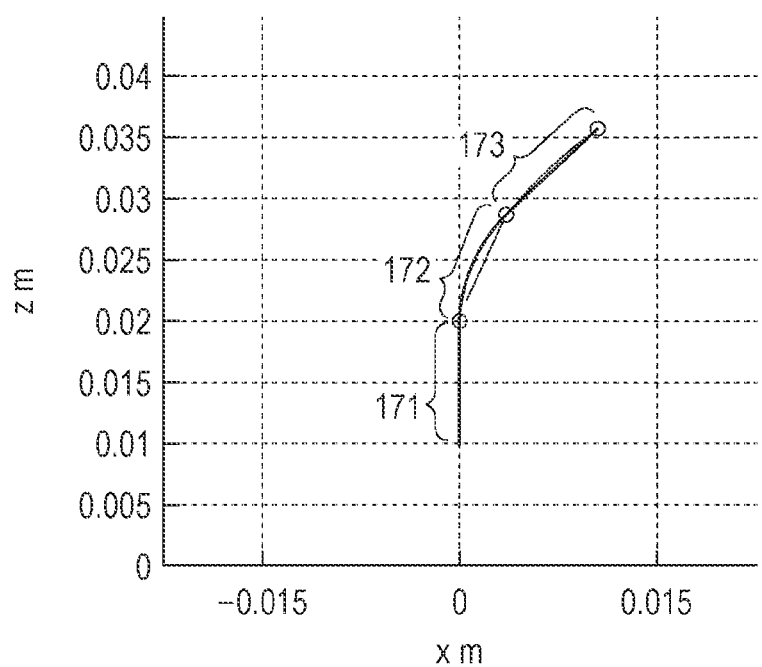
FIG. 15B is another diagram illustrating the example of the result of simulation of the continuum robot control method by the continuum robot control system according to the third embodiment of the present disclosure.

In FIG. 15A and FIG. 15B, the same follow-the-leader control as that illustrated in FIG. 9A and FIG. 9B is performed.

Figure 15C:
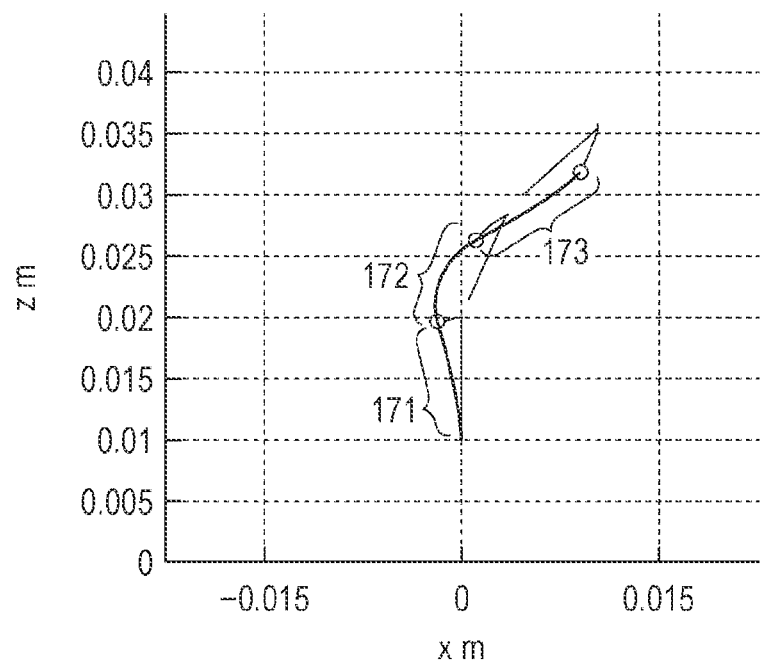
FIG. 15C is another diagram illustrating the example of the result of simulation of the continuum robot control method by the continuum robot control system according to the third embodiment of the present disclosure.
Figure 15D:
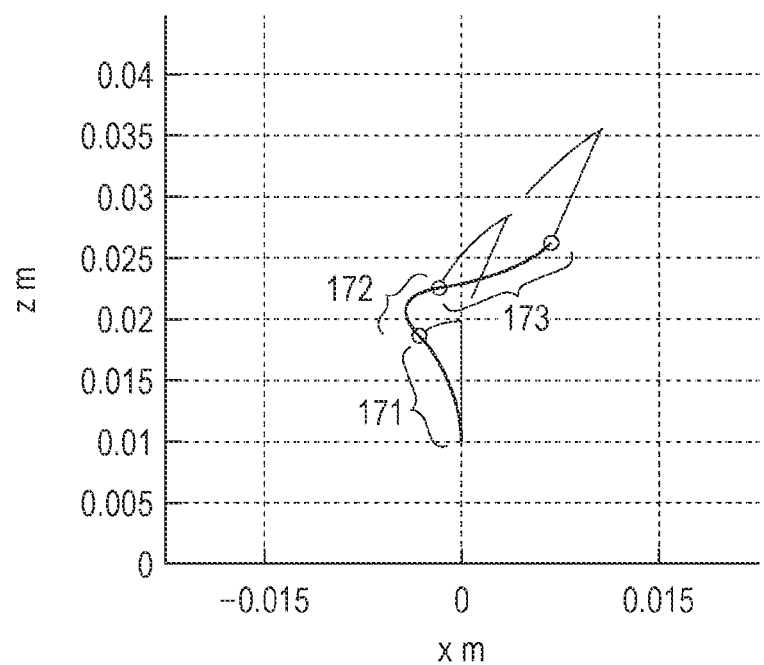
FIG. 15D is another diagram illustrating the example of the result of simulation of the continuum robot control method by the continuum robot control system according to the third embodiment of the present disclosure.

FIG. 15C and FIG. 15D illustrate an operator's operation of the operating lever for the bending angle of the second bending section 172. This causes the switch unit 330 to reverse the position of the triple-pole double-throw switch illustrated in FIG. 14, so that the attitudes illustrated in FIG. 15C and FIG. 15D are reached by adding an operation to the attitude set by the follow-the-leader control. In this simulation, the bending angle of the first bending section 171 $\theta_{1ref}$ is changed in conjunction with the difference between the command angle of the follow-the-leader control on the second bending section 172 and the angle of the additional operation $(\theta_{l2}-\theta_{2FTL})$ in such a way as to satisfy Equation (10) below:

$$\theta_{1ref}=\theta_{1FTL}-(\theta_{l2}-\theta_{2FTL}) \qquad (10)$$

The operator can thus change the displacement of the distal-most end in the forward and backward direction of movement while keeping constant the direction of the leading end of the third bending section 173.

Figure 15E:
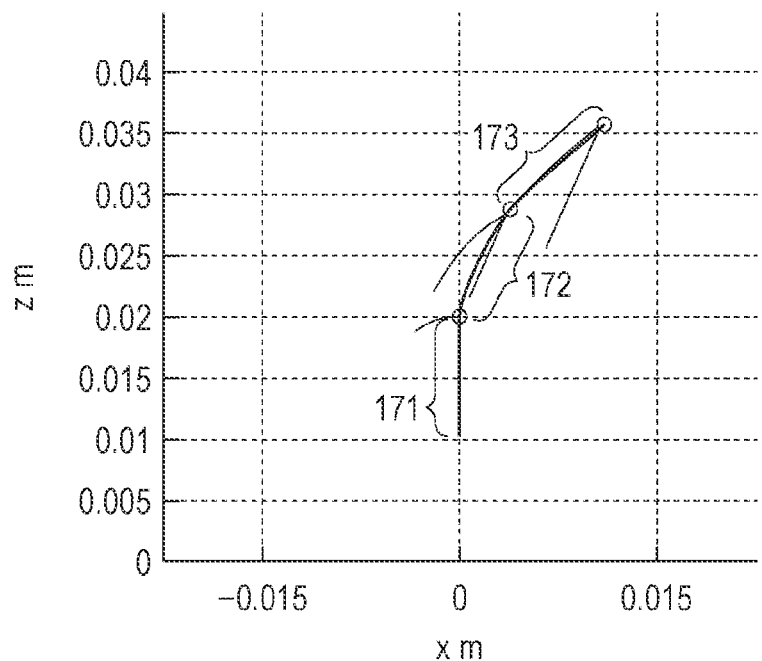
FIG. 15E is another diagram illustrating the example of the result of simulation of the continuum robot control method by the continuum robot control system according to the third embodiment of the present disclosure.
Figure 15F:
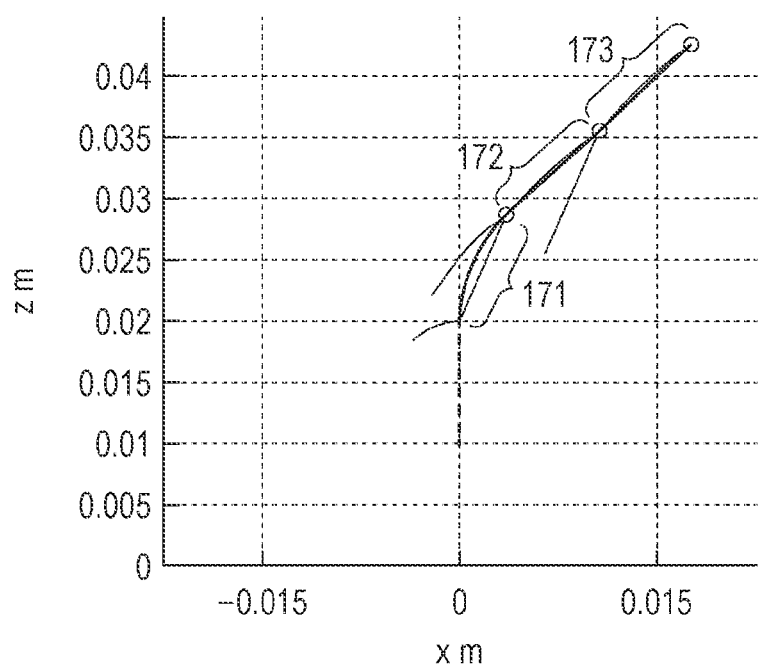
FIG. 15F is another diagram illustrating the example of the result of simulation of the continuum robot control method by the continuum robot control system according to the third embodiment of the present disclosure.

FIG. 15E and FIG. 15F show that as the base 140 moves further, the follow-the-leader control can continue, which allows the second bending section 172 and the first bending section 171 to follow the third bending section 173 and the second bending section 172, respectively.

The simulations illustrated in FIG. 15A to FIG. 15F have been described by taking the bending angle θ into account, because motion control of the bendable portion 170 is assumed to take place in the xz plane. If the motion control takes place in the xyz three-dimensional space, the rotational angle ζ may also be taken into account.

Like the first embodiment, the third embodiment can prevent the continuum robot 100 from accidentally coming into contact with an object. Therefore, it is possible to prevent the object or the continuum robot 100 from being damaged, and ensure safe operation of the continuum robot 100.

Fourth Embodiment

A fourth embodiment of the present disclosure will now be described. In the description of the fourth embodiment, things in common with the first to third embodiments will be omitted, and things different from the first to third embodiments will be described.

A general configuration of a continuum robot according to the fourth embodiment is the same as the general configuration of the continuum robot 100 according to the first embodiment illustrated in FIG. 1 and FIG. 2. A general configuration of an operating device according to the fourth embodiment is the same as the general configuration of the operating device 200-1 according to the first embodiment illustrated in FIG. 3.

The first to third embodiments described above assume that an additional bending operation takes place during forward movement which involves follow-the-leader control. In the fourth embodiment, an additional bending operation that takes place during backward movement will be described. During backward movement, the bending angle θ and the rotational angle ζ of the distal-most bending section may be controlled by the operator as in the case of during forward movement. Alternatively, an operation during forward movement may be recorded and reproduced in accordance with the displacement $z_b$ of the base 140.

Figure 16:
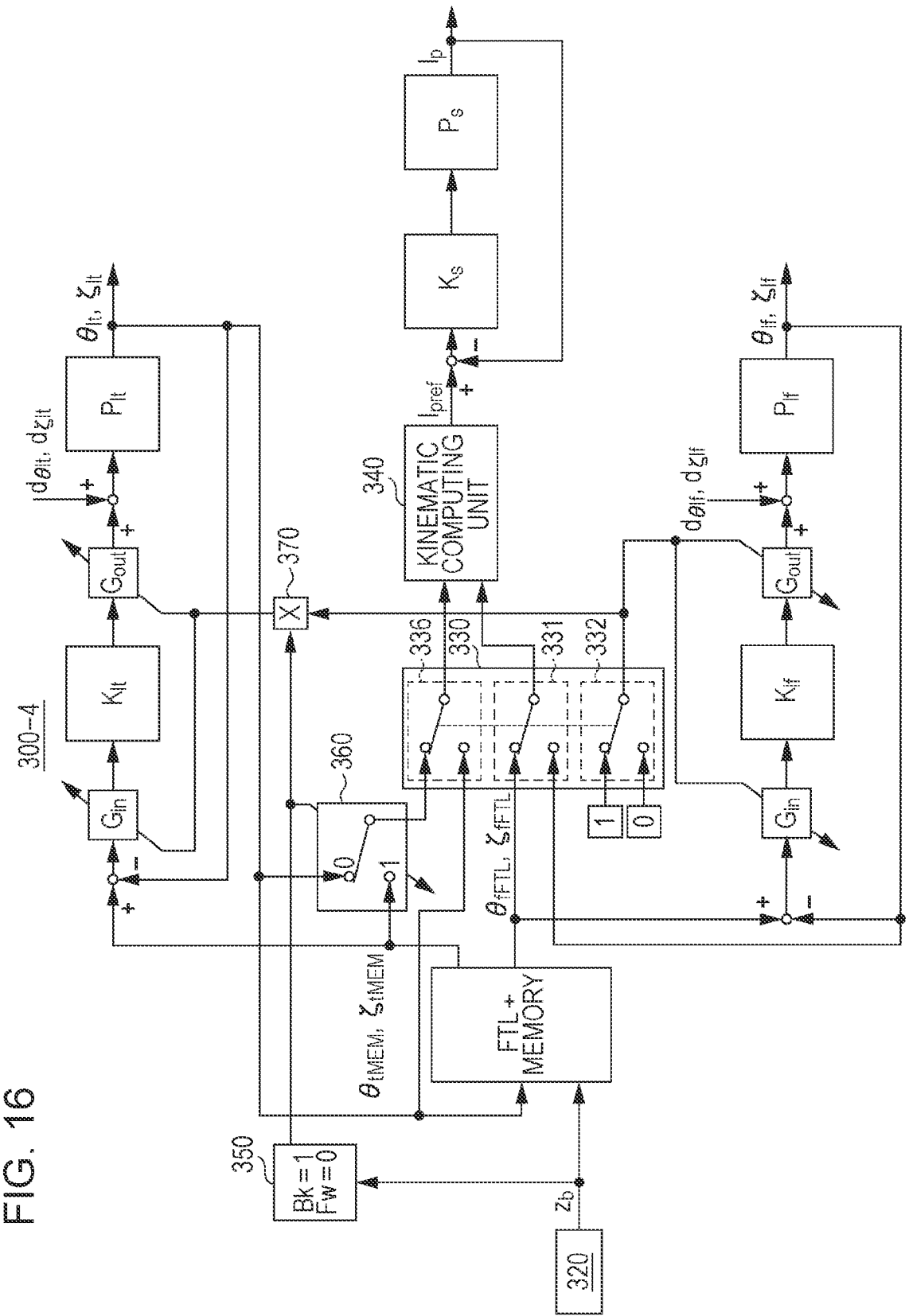
FIG. 16 is a diagram illustrating an example of a general configuration of a continuum robot control system according to a fourth embodiment of the present disclosure.

FIG. 16 is a diagram illustrating an example of a general configuration of the continuum robot control system 300 according to the fourth embodiment of the present disclosure. In the following description, the continuum robot control system 300 according to the fourth embodiment illustrated in FIG. 16 is referred to as a "continuum robot control system 300-4". In FIG. 16, the same elements as those in FIG. 11 are denoted by the same reference numerals and their detailed description will be omitted.

The continuum robot control system 300-4 according to the fourth embodiment, illustrated in FIG. 16, is obtained by adding some components (described below) to, and changing some components (described below) of, the continuum robot control system 300-2 according to the second embodiment illustrated in FIG. 11.

Unlike the continuum robot control system 300-2 illustrated in FIG. 11, the continuum robot control system 300-4 includes a "Bk=1 Fw=0" block 350 and a switch unit 360. The continuum robot control system 300-4 does not include the block $K_r$ of the continuum robot control system 300-2 illustrated in FIG. 11. The switch unit 330 of the continuum robot control system 300-4 includes a sixth switch 336, instead of the third switch 333 of the continuum robot control system 300-2 illustrated in FIG. 11. The continuum robot control system 300-4 includes a multiplication block 370, instead of the NOT gate downstream of the second switch 332 in the continuum robot control system 300-2 illustrated in FIG. 11.

The "Bk=1 Fw=0" block 350 is base determining means that determines whether the base 140 is moving forward or backward, on the basis of the displacement $z_b$ of the base 140. The "Bk=1 Fw=0" block 350 outputs a "0" signal if determining that the base 140 is moving forward, and outputs a "1" signal if determining that the base 140 is moving backward.

The switch unit 360 is distal-most switching means that performs a switching operation for selecting, on the basis of the determination made by the "Bk=1 Fw=0" block 350, the target bending angle and the target rotational angle of the distal-most bending section stored in the block FTL+Memory (storage unit), or the target bending angle $\theta_{lt}$ and the target rotational angle $\zeta_{lt}$ of the distal-most bending section obtained from the block $P_{lt}$ (distal-most operating means). Specifically, the switch unit 360 operates in conjunction with an output signal of the "Bk=1 Fw=0" block 350. For example, if the "Bk=1 Fw=0" block 350 determines that the base 140 is moving backward (if a "1" signal is output), the switch unit 360 performs a switching operation for selecting the target bending angle and the target rotational angle of the distal-most bending section stored in the block FTL+Memory (storage unit). On the basis of the target bending angle and the target rotational angle of the distal-most bending section selected by the switch unit 360, the kinematic computing unit 340 computes the drive displacement by which the driving unit of the continuum robot 100 drives the wire in the distal-most bending section.

Specifically, in the state of the triple-pole double-throw switch of the switch unit 330 and the state of a single-pole double-throw switch of the switch unit 360 illustrated in FIG. 16, the positioning control of the operating lever for the distal-most bending section is disabled. In this case, the operating angle of the operating lever operated by the operator is received through the single-pole double-throw switch of the switch unit 360 by the kinematic computing unit 340, so that follow-the-leader control is performed. If the base 140 is moved backward at this point, the switch unit 360 reverses the position of the single-pole double-throw switch illustrated in FIG. 16. In this case, the positioning control of the operating lever for the distal-most bending section is enabled. As the target values of the positioning control, the target bending angle and the target rotational angle of the distal-most bending section recorded during forward movement and corresponding to the displacement $z_b$ of the base 140 are output from the FTL+Memory (storage unit). At the same time, the target bending angle and the target rotational angle of the distal-most bending section are received by the kinematic computing unit 340, so that the continuum robot 100 reproduces the shape recoded during forward movement while moving backward.

When operator's contact with the operating lever for the following bending section is detected, the control system of the present embodiment causes the switch unit 330 to reverse the position of the triple-pole double-throw switch illustrated in FIG. 16. The motion of the following bending section at this point is the same as that in the first embodiment. As for control of the distal-most bending section, the positioning control of the operating lever for the distal-most bending section is disabled regardless of whether the displacement $z_b$ of the base 140 is forward or backward, and the operating angle of the operating lever operated by the operator is received through the switch unit 330 by the kinematic computing unit 340 without passing through the switch unit 360.

The third embodiment allows seamless transition to an operator's additional operation as in the first embodiment while controlling the distal-most bending section during backward movement in such a way as to reproduce the operation recorded during forward movement.

Fifth Embodiment

A fifth embodiment of the present disclosure will now be described. In the description of the fifth embodiment, things in common with the first to fourth embodiments will be omitted, and things different from the first to fourth embodiments will be described.

A general configuration of a continuum robot according to the fifth embodiment is the same as the general configuration of the continuum robot 100 according to the first embodiment illustrated in FIG. 1 and FIG. 2. A general configuration of a continuum robot control system according to the fifth embodiment of the present disclosure may be any of the general configurations of the continuum robot control systems 300-1 to 300-4 according to the first to fourth embodiments.

The first to fourth embodiments assume that the operating device 200-1, illustrated in FIG. 3, is used which includes operating levers that correspond one-to-one to the bending angle and the rotational angle of each bending section. In the fifth embodiment, a joystick with a dual-axis motor is used as the operating device 200.

Figure 17:
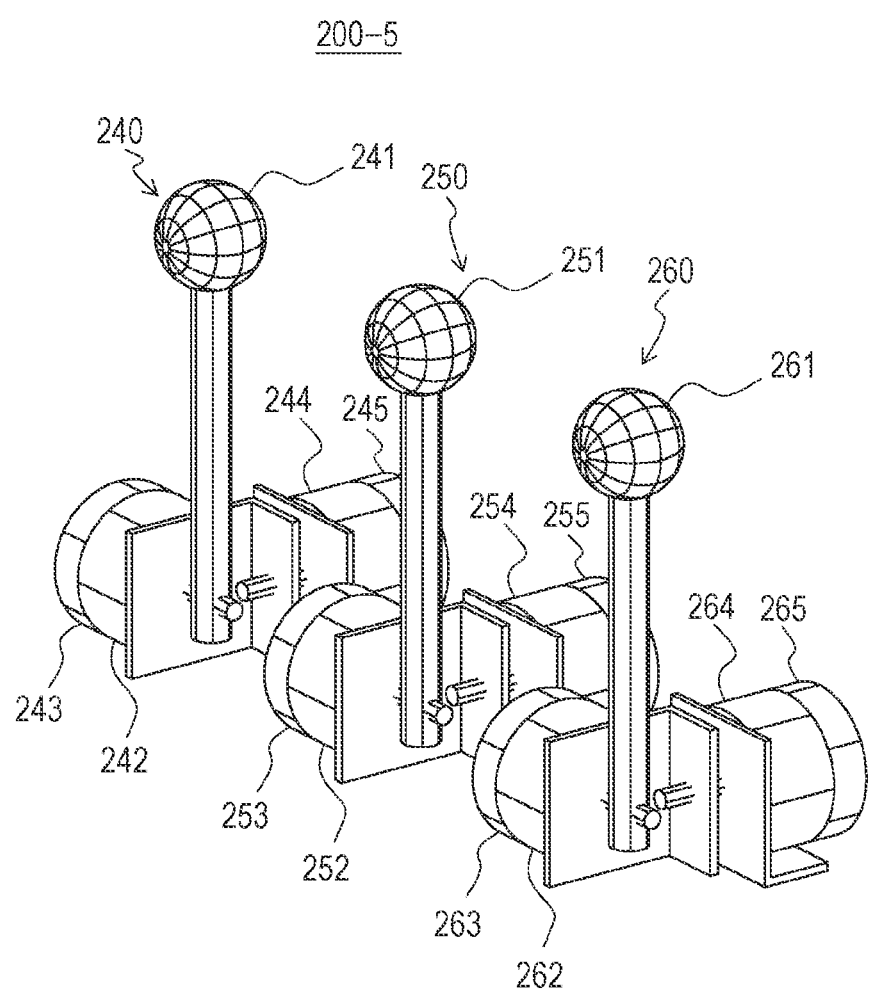
FIG. 17 is a diagram illustrating an example of a general configuration of an operating device for operating the three bending sections of the continuum robot illustrated in FIG. 1, according to a fifth embodiment of the present disclosure.

FIG. 17 is a diagram illustrating an example of a general configuration of the operating device 200 for operating the three bending sections 171 to 173 of the continuum robot 100 illustrated in FIG. 1, according to the fifth embodiment of the present disclosure. In the following description, the operating device 200 according to the fifth embodiment illustrated in FIG. 17 is referred to as an "operating device 200-5".

As illustrated in FIG. 17, the operating device 200-5 includes a first operating unit 240 for operating the first bending section 171, a second operating unit 250 for operating the second bending section 172, and a third operating unit 260 for operating the third bending section 173.

The first operating unit 240 includes an operating lever 241, motors 242 and 244, and angular sensors 243 and 245. The operating lever 241 is an operating lever for the first bending section 171. The angular sensors 243 and 245 detect operating angles $\varphi_{x1}$ and $\varphi_{y1}$, respectively, with respect to the first bending section 171. The motors 242 and 244 are motors for applying control torques to the operating angles $\varphi_{x1}$ and $\varphi_{y1}$, respectively.

The second operating unit 250 includes an operating lever 251, motors 252 and 254, and angular sensors 253 and 255. The operating lever 251 is an operating lever for the second bending section 172. The angular sensors 253 and 255 detect operating angles $\varphi_{x2}$ and $\varphi_{y2}$, respectively, with respect to the second bending section 172. The motors 252 and 254 are motors for applying control torques to the operating angles $\varphi_{x2}$ and $\varphi_{y2}$, respectively.

The third operating unit 260 includes an operating lever 261, motors 262 and 264, and angular sensors 263 and 265. The operating lever 261 is an operating lever for the third bending section 173. The angular sensors 263 and 265 detect operating angles $\varphi_{x3}$ and $\varphi_{y3}$, respectively, with respect to the third bending section 173. The motors 262 and 264 are motors for applying control torques to the operating angles $\varphi_{x3}$ and $\varphi_{y3}$, respectively.

For use in the control systems described in the first to fourth embodiments, a coordinate transformation may be performed as in Equation (11) below:

$$\theta_{ln} = \sqrt{\phi_{xn}^2 + \phi_{yn}^2}, \quad \zeta_{ln} = \tan^{-1}\frac{\phi_{yn}}{\phi_{xn}} \tag{11}$$

where $\varphi_{xn}$ and $\varphi_{yn}$ are operating angles with respect to the n-th bending section.

Sixth Embodiment

A sixth embodiment of the present disclosure will now be described. In the description of the sixth embodiment, things in common with the first to fifth embodiments will be omitted, and things different from the first to fifth embodiments will be described.

A general configuration of a continuum robot according to the sixth embodiment is the same as the general configuration of the continuum robot 100 according to the first embodiment illustrated in FIG. 1 and FIG. 2. A general configuration of an operating device according to the sixth embodiment is the same as the general configuration of the operating device 200-1 according to the first embodiment illustrated in FIG. 3.

For switching between the follow-the-leader control and the additional operation, the control systems described in the first to fifth embodiments use a value of 0 or 1 for the blocks $G_{in}$ and $G_{out}$. However, since such switching between two values may lead to abrupt behavior caused by operation of an operating lever, a control system illustrated in FIG. 18 may be used.

Figure 18:
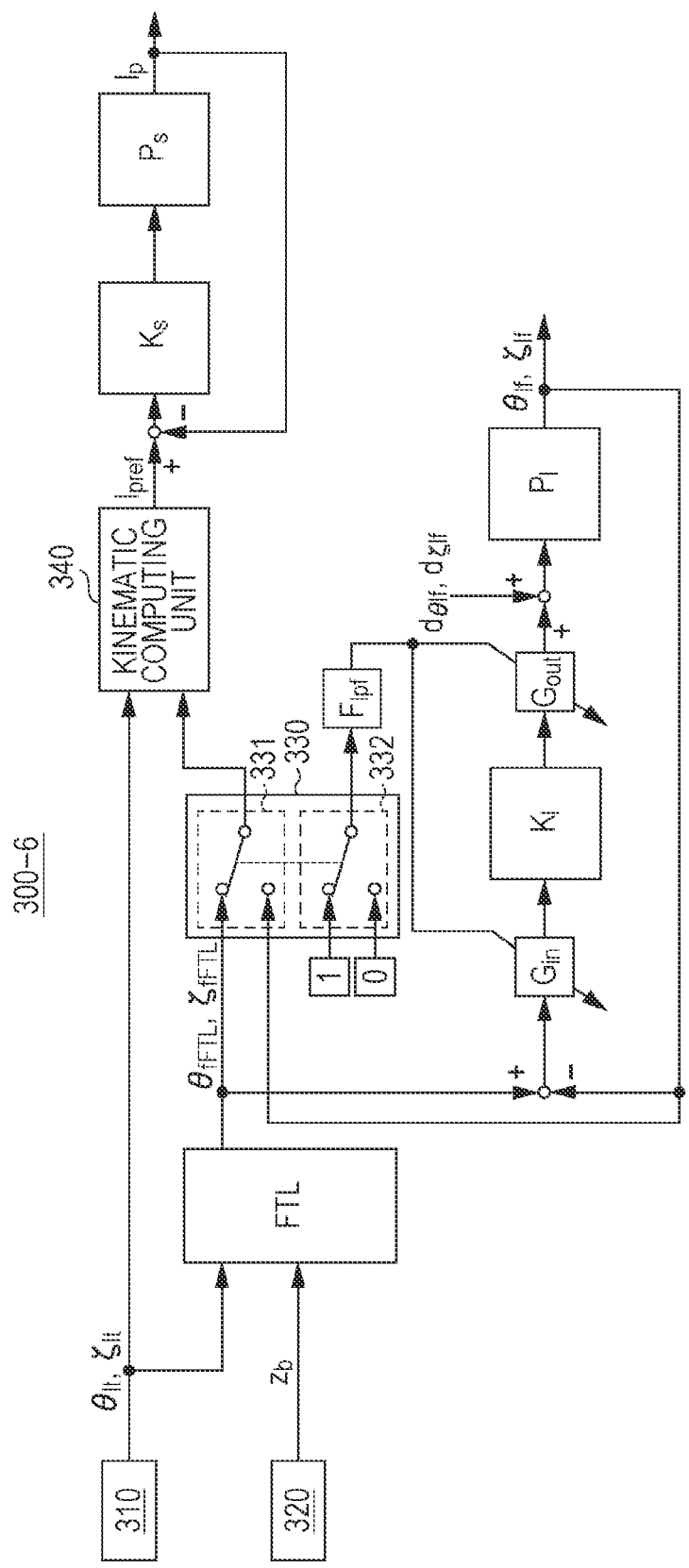
FIG. 18 is a diagram illustrating an example of a general configuration of a continuum robot control system according to a sixth embodiment of the present disclosure.

FIG. 18 is a diagram illustrating an example of a general configuration of the continuum robot control system 300 according to the sixth embodiment of the present disclosure. In the following description, the continuum robot control system 300 according to the sixth embodiment illustrated in FIG. 18 is referred to as a "continuum robot control system 300-6". In FIG. 18, the same elements as those in FIG. 4 are denoted by the same reference numerals and their detailed description will be omitted.

The continuum robot control system 300-6 according to the sixth embodiment, illustrated in FIG. 18, is obtained by adding some components (described below) to, and changing some components (described below) of, the continuum robot control system 300-1 according to the first embodiment illustrated in FIG. 4.

Unlike the continuum robot control system 300-1 illustrated in FIG. 4, the continuum robot control system 300-6 includes a low-pass filter $F_{lpf}$ downstream of the second switch 332 of the switch unit 330. In the continuum robot control system 300-6 according to the sixth embodiment illustrated in FIG. 18, a signal passing through the low-pass filter $F_{lpf}$ is received by the blocks $G_{in}$ and $G_{out}$. In this case, the break frequency of the low-pass filter $F_{lpf}$ may be about 1 Hz. FIG. 18 illustrates the changes made to the control system of the first embodiment. The same changes as those described may be made to the control systems of the second to fourth embodiments.

Other Embodiments

One or more features of the present disclosure can also be implemented by processing where a program that performs one or more functions of the embodiments described above is supplied through a network or storage medium to a system or apparatus, and one or more processors in a computer of the system or apparatus read and execute the program. One or more features of the present disclosure can also be implemented by a circuit (e.g., application-specific integrated circuit or ASIC) that performs one or more functions.

A program and a computer-readable storage medium that stores the program are included in the present disclosure.

One or more features of the present disclosure can ensure safe operation of the continuum robot.

While one or more features of the present disclosure have been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. A continuum robot control system for controlling a continuum robot that includes a bendable portion having a plurality of bending sections bent by being driven by a wire, a base configured to support the bendable portion, and a driving unit configured to drive the wire, the continuum robot control system comprising:
following calculating means for calculating a target bending angle and a target rotational angle of a following bending section of the plurality of bending sections on the basis of a target bending angle and a target rotational angle of a distal-most bending section of the plurality of bending sections and a displacement of the base in a direction of movement of the continuum robot, the distal-most bending section being located farthest from the base, the following bending section being located between the distal-most bending section and the base;
following operating means for receiving a target bending angle and a target rotational angle of the following bending section by being operated;
following switching means for performing a switching operation for selecting the target bending angle and the target rotational angle of the following bending section obtained from the following calculating means or the target bending angle and the target rotational angle of the following bending section obtained from the following operating means;
computing means for computing, on the basis of the target bending angle and the target rotational angle of the following bending section selected by the following switching means, a drive displacement by which the driving unit drives the wire in the following bending section;
storage means for storing the target bending angle and the target rotational angle of the distal-most bending section;
distal-most calculating means for calculating the target bending angle and the target rotational angle of the distal-most bending section on the basis of the target bending angle and the target rotational angle of the distal-most bending section stored in the storage means and the target bending angle and the target rotational angle of the following bending section received by the following operating means;
distal-most operating means for receiving a target bending angle and a target rotational angle of the distal-most bending section by being operated; and
distal-most switching means for performing a switching operation for selecting the target bending angle and the target rotational angle of the distal-most bending section obtained from the distal-most calculating means or the target bending angle and the target rotational angle of the distal-most bending section obtained from the distal-most operating means,
wherein the computing means further computes, on the basis of the target bending angle and the target rotational angle of the distal-most bending section selected by the distal-most switching means, a drive displacement by which the driving unit drives the wire in the distal-most bending section; and
in a case where an operator's contact with the following operating means is detected, the distal-most switching means performs a switching operation for selecting the target bending angle and the target rotational angle of the distal-most bending section obtained from the distal-most calculating means.

2. The continuum robot control system according to claim 1, wherein in a case where an operator's contact with the following operating means is detected, the following switching means performs a switching operation for selecting the target bending angle and the target rotational angle of the following bending section obtained from the following operating means.

3. The continuum robot control system according to claim 1,
wherein the following calculating means calculates the target bending angle and the target rotational angle of the following bending section by using the target bending angle and the target rotational angle of the distal-most bending section obtained from the distal-most operating means.

4. The continuum robot control system according to claim 3, wherein the following operating means and the distal-most operating means each include a motor, an operating lever driven by the motor, and an angular sensor.

5. A continuum robot control system for controlling a continuum robot that includes a bendable portion having a plurality of bending sections bent by being driven by a wire, a base configured to support the bendable portion, and a driving unit configured to drive the wire, the continuum robot control system comprising:
following calculating means for calculating a target bending angle and a target rotational angle of a following bending section of the plurality of bending sections on the basis of a target bending angle and a target rotational angle of a distal-most bending section of the plurality of bending sections and a displacement of the base in a direction of movement of the continuum robot, the distal-most bending section being located farthest from the base, the following bending section being located between the distal-most bending section and the base;

following operating means for receiving a target bending angle and a target rotational angle of the following bending section by being operated;

following switching means for performing a switching operation for selecting the target bending angle and the target rotational angle of the following bending section obtained from the following calculating means or the target bending angle and the target rotational angle of the following bending section obtained from the following operating means; and computing means for computing, on the basis of the target bending angle and the target rotational angle of the following bending section selected by the following switching means, a drive displacement by which the driving unit drives the wire in the following bending section, wherein the bendable portion includes at least a first following bending section and a second following bending section; and the following operating means includes first following operating means and second following operating means corresponding to the first following bending section and the second following bending section, respectively, wherein the continuum robot control system further comprises control gain means for multiplying, by a control gain, a target bending angle and a target rotational angle of the second following bending section obtained from the second following operating means, and wherein in a case where an operator's contact with the second following operating means is detected, the following switching means performs a switching operation for selecting, as a target bending angle and a target rotational angle of the second following bending section, the target bending angle and the target rotational angle of the second following bending section obtained from the second following operating means, and performs a switching operation for selecting, as a target bending angle and a target rotational angle of the first following bending section, the target bending angle and the target rotational angle of the second following bending section multiplied by the control gain by the control gain means.

6. A continuum robot control system for controlling a continuum robot that includes a bendable portion having a plurality of bending sections bent by being driven by a wire, a base configured to support the bendable portion, and a driving unit configured to drive the wire, the continuum robot control system comprising:

following calculating means for calculating a target bending angle and a target rotational angle of a following bending section of the plurality of bending sections on the basis of a target bending angle and a target rotational angle of a distal-most bending section of the plurality of bending sections and a displacement of the base in a direction of movement of the continuum robot, the distal-most bending section being located farthest from the base, the following bending section being located between the distal-most bending section and the base;

following operating means for receiving a target bending angle and a target rotational angle of the following bending section by being operated;

following switching means for performing a switching operation for selecting the target bending angle and the target rotational angle of the following bending section obtained from the following calculating means or the target bending angle and the target rotational angle of the following bending section obtained from the following operating means;

computing means for computing, on the basis of the target bending angle and the target rotational angle of the following bending section selected by the following switching means, a drive displacement by which the driving unit drives the wire in the following bending section;

storage means for storing the target bending angle and the target rotational angle of the distal-most bending section;

base determining means for determining whether the base is moving forward or backward on the basis of the displacement of the base;

distal-most operating means for receiving the target bending angle and the target rotational angle of the distal-most bending section by being operated; and distal-most switching means for performing a switching operation for selecting the target bending angle and the target rotational angle of the distal-most bending section stored in the storage means or the target bending angle and the target rotational angle of the distal-most bending section obtained from the distal-most operating means, wherein the computing means further computes, on the basis of the target bending angle and the target rotational angle of the distal-most bending section selected by the distal-most switching means, a drive displacement by which the driving unit drives the wire in the distal-most bending section; and in a case where the base determining means determines that the base is moving backward, the distal-most switching means performs a switching operation for selecting the target bending angle and the target rotational angle of the distal-most bending section stored in the storage means.

* * * * *